(12) United States Patent  
Sundaresan et al.

(10) Patent No.: US 8,977,631 B2  
(45) Date of Patent: *Mar. 10, 2015

(54) VISUALIZATION OF REPUTATION RATINGS

(75) Inventors: Neelakantan Sundaresan, Mountain View, CA (US); Kavita Ganesan, San Jose, CA (US); Harshal Ulhas Deo, San Jose, CA (US)

(73) Assignee: eBay Inc., San Jose, CA (US)

( * ) Notice: Subject to any disclaimer, the term of this patent is extended or adjusted under 35 U.S.C. 154(b) by 1445 days.

This patent is subject to a terminal disclaimer.

(21) Appl. No.: 11/834,817

(22) Filed: Aug. 7, 2007

(65) Prior Publication Data

US 2008/0256040 A1    Oct. 16, 2008

Related U.S. Application Data

(60) Provisional application No. 60/912,077, filed on Apr. 16, 2007, provisional application No. 60/912,389, filed on Apr. 17, 2007.

(51) Int. Cl.
```
G06F 17/30       (2006.01)
G06Q 30/02       (2012.01)
G06F 3/14        (2006.01)
```
(52) U.S. Cl.  
CPC ............... *G06Q 30/02* (2013.01); *G06F 17/30* (2013.01); *G06F 3/14* (2013.01)  
USPC ........... 707/750; 707/727; 707/730; 707/748; 707/763

(58) Field of Classification Search  
CPC ...................................................... G06F 17/30  
USPC ........ 707/1–2, 7–8, 10, 100, 102, 104.1, 200, 707/705–711, 723, 748, 777, 802; 705/1–2, 705/26–27, 18, 75, 35–39; 706/45–50  
See application file for complete search history.

(56) References Cited

U.S. PATENT DOCUMENTS 6,026,376 A    2/2000  Kenney  
6,073,124 A    6/2000  Krishnan et al.  
(Continued)

FOREIGN PATENT DOCUMENTS

EP     1296241 A1     3/2003  
WO    WO-0111511     2/2001  
(Continued)

OTHER PUBLICATIONS

Sergei V et al. "using web-graph distance for relevance feedback in web search", ACM 2006, pp. 147-148.*

(Continued)

*Primary Examiner* — Srirama Channavajjala  
(74) *Attorney, Agent, or Firm* — Schwegman Lundberg & Woessner, P.A.

(57) ABSTRACT

In one embodiment, a system and method is illustrated including receiving a feedback request identifying a particular user, retrieving a feedback entry in response to the feedback request, the feedback entry containing a first term, building a scoring model based, in part, upon a term frequency count denoting a frequency with which the first term appears in a searchable data structure, mapping the first term to a graphical illustration based upon a second term associated with the graphical illustration such that the graphical illustration may be used to represent the second term, and generating a feedback page containing the first term and the graphical illustration. The method may include assigning a value to the first term so as to identify the first term, assigning the first term to the searchable data structure, and extracting the first term from the searchable data structure based, in part, upon an extraction rule.

22 Claims, 17 Drawing Sheets

(56) References Cited

U.S. PATENT DOCUMENTS

| | | | |
|---|---|---|---|
| 6,295,559 B1 * | 9/2001 | Emens et al. | 709/225 |
| 6,405,175 B1 * | 6/2002 | Ng | 705/14.26 |
| 6,493,744 B1 * | 12/2002 | Emens et al. | 709/203 |
| 7,058,625 B2 * | 6/2006 | Bossemeyer et al. | 707/3 |
| 7,249,139 B2 | 7/2007 | Chuah et al. | |
| 7,266,511 B2 | 9/2007 | Teshima | |
| 7,269,573 B1 | 9/2007 | Bunn et al. | |
| 2001/0011239 A1 | 8/2001 | Kondoh et al. | |
| 2001/0037368 A1 | 11/2001 | Huang | |
| 2001/0056377 A1 | 12/2001 | Kondoh et al. | |
| 2002/0107752 A1 | 8/2002 | Rivera et al. | |
| 2003/0014423 A1 | 1/2003 | Chuah et al. | |
| 2004/0083127 A1 * | 4/2004 | Lunsford et al. | 705/10 |
| 2004/0166401 A1 * | 8/2004 | Srinivas | 429/44 |
| 2004/0243568 A1 * | 12/2004 | Wang et al. | 707/3 |
| 2005/0027612 A1 * | 2/2005 | Walker et al. | 705/26 |
| 2005/0192958 A1 * | 9/2005 | Widjojo et al. | 707/5 |
| 2005/0251553 A1 * | 11/2005 | Gottfried | 709/204 |
| 2006/0085259 A1 | 4/2006 | Nicholas et al. | |
| 2006/0143095 A1 | 6/2006 | Sandus et al. | |
| 2006/0218577 A1 | 9/2006 | Goodman et al. | |
| 2006/0247946 A1 * | 11/2006 | Gordon | 705/1 |
| 2007/0027830 A1 * | 2/2007 | Simons et al. | 707/1 |
| 2007/0112738 A1 * | 5/2007 | Livaditis | 707/3 |
| 2008/0010167 A1 | 1/2008 | Bunn et al. | |
| 2008/0255957 A1 | 10/2008 | Erdem et al. | |
| 2008/0255967 A1 | 10/2008 | Shi | |

FOREIGN PATENT DOCUMENTS

| | | | |
|---|---|---|---|
| WO | WO 2004/059595 | * | 7/2004 |
| WO | WO-2008/130531 A1 | | 10/2008 |
| WO | WO-2008/130575 A1 | | 10/2008 |

OTHER PUBLICATIONS

Rohini U et al. "A novel approach for re-ranking of search results using collaborative filtering", IEEE 2007, 5 pages.*

Kavita A. Ganesan et al. "Mining Tag Clouds and Emoticons behind Community Feedback", WWW 2008 poster paper, pp. 1181-1182.*

M.L. Kherfi,. et al. "Combining positive and negative examples in relevance feedback for content-based image retrieval", J. Vis. Commun. Image R. 14 (2003) 428-457.*

International Application Serial No. PCT/US2008/004831, Search Report mailed Jul. 14, 2008, 4 pgs.

International Application Serial No. PCT/US2008/004831, Written Opinion mailed Jul. 14, 2008, 5 pgs.

International Application Serial No. PCT/US2008/004912 Search Report mailed Jul. 14, 2008, 4 pgs.

International Application Serial No. PCT/US2008/004912 Written Opinion mailed Jul. 14, 2008, 7 pgs.

* cited by examiner

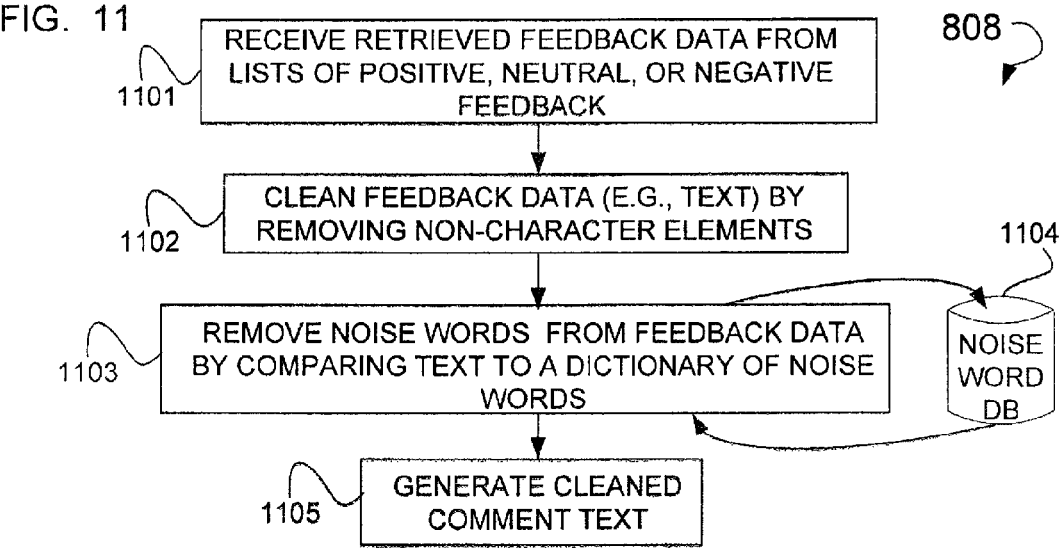
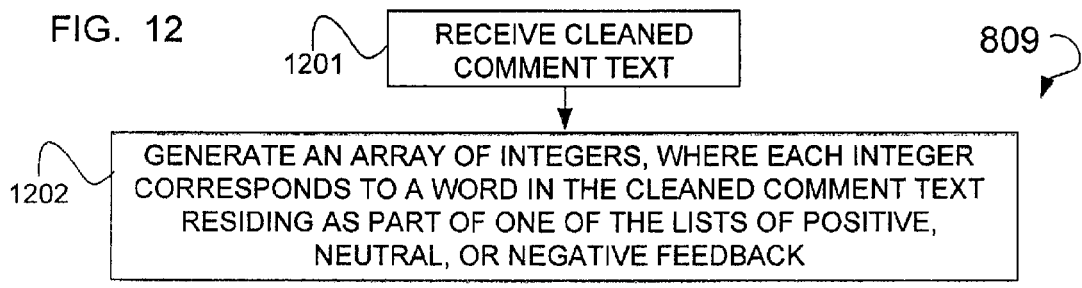

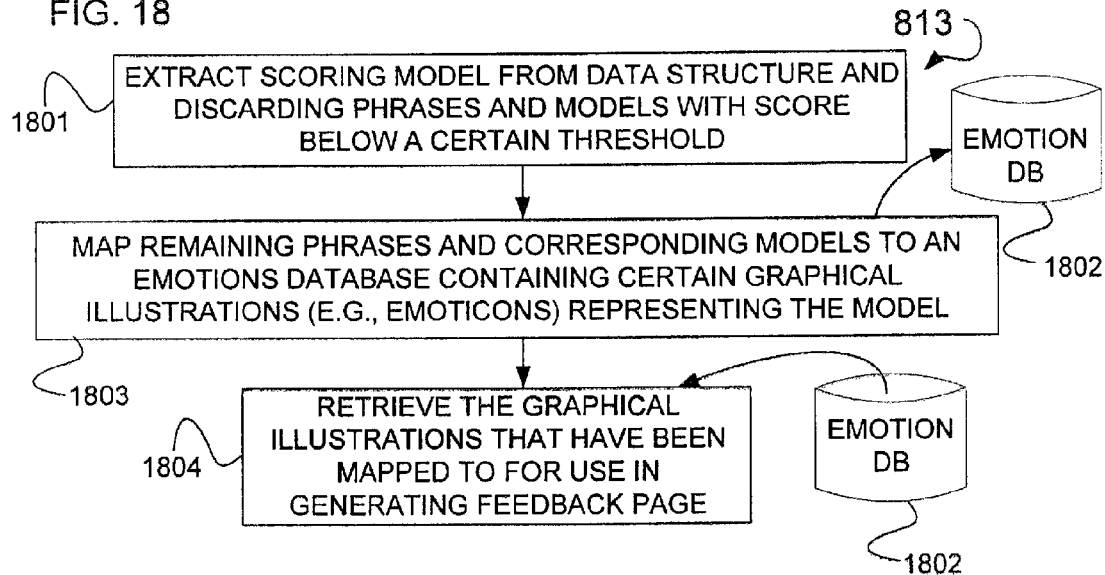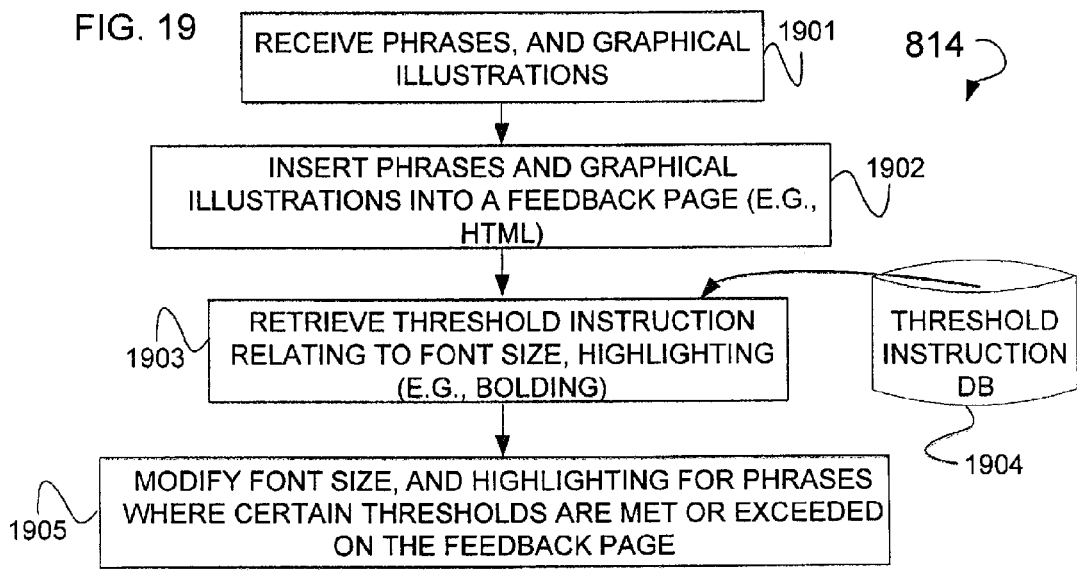

VISUALIZATION OF REPUTATION RATINGS

CROSS REFERENCE TO RELATED APPLICATIONS

This is a non-provisional patent application claiming priority under 35 USC §119(e) to U.S. Provisional Patent Application No. 60/912,077 entitled "PUBLICATION AND INFORMATION SYSTEM" that was filed on Apr. 16, 2007, and U.S. Provisional Patent Application No. 60/912,389 filed on Apr. 17, 2007 entitled "VISUALIZATION OF REPUTATION RATINGS", both of which are incorporated by reference in their entirety.

TECHNICAL FIELD

The present application relates generally to the technical field of search algorithms and, in one specific example, to the use of a search algorithm to generate feedback.

BACKGROUND

Customer feedback for online transactions allows potential purchasers of goods or services to evaluate a seller of a good or service prior to engaging in a transaction with the seller. In some cases, this feedback takes the form of statements regarding a particular seller, a good or service, or a category of good or service being sold. These statements may range form being very general to being very specific in terms of the information that they convey.

SUMMARY OF THE INVENTION

Systems and methods for the visualization of reputation ratings are provided. In some embodiments, a method comprises receiving a feedback request identifying a particular user. A feedback entry may be retrieved in response to the feedback request. The feedback entry may contain a first term. A scoring model may be built based, in part, upon a term frequency count denoting a frequency with which the first term appears in a searchable data structure. The first term may be mapped to a graphical illustration based upon a second term associated with the graphical illustration such that the graphical illustration may be used to represent the second term. A feedback page may be generated containing the first term and the graphical illustration.

BRIEF DESCRIPTION OF THE DRAWINGS

Some embodiments are illustrated by way of example and not limitation in the figures of the accompanying drawings in which:

FIG. 11 is a flowchart illustrating a method used to execute an operation that filters certain noise words, according to an example embodiment.

FIG. 12 is a flowchart illustrating a method used to execute an operation that assigns words to an array, or some other suitable data structure, according to an example embodiment

FIG. 18 is a flowchart illustrating a method used to execute an operation that compares the frequency count for each of the phrases against certain graphic standards relating to particular graphical illustrations (e.g., emoticons), according to an example embodiment.

FIG. 19 is a flowchart illustrating a method used to execute an operation that generates the feedback page, according to an example embodiment.

DETAILED DESCRIPTION

Figure 1:
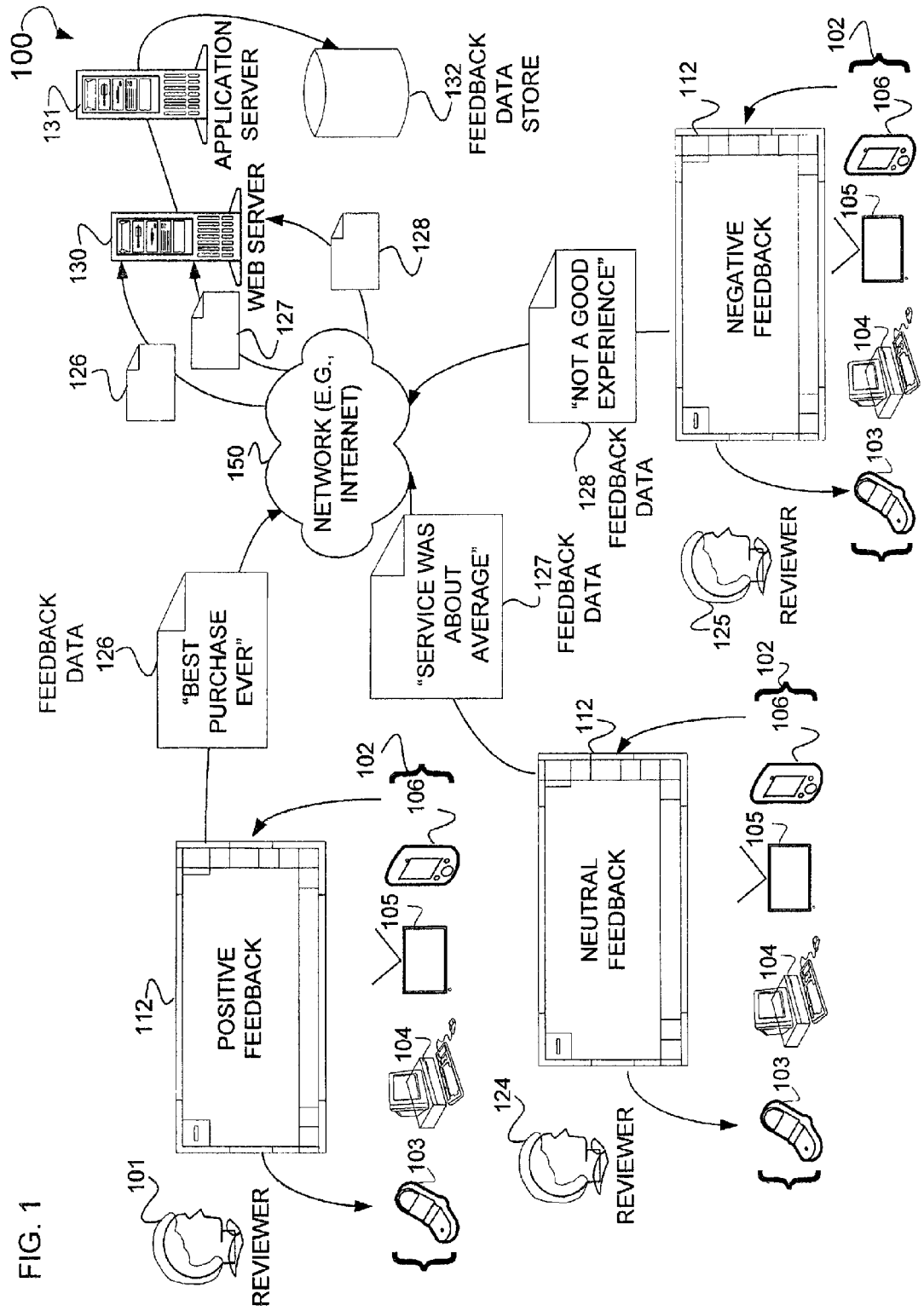
FIG. 1 is a diagram of a system illustrating the generation of feedback data, according to an example embodiment.

Example methods and systems to facilitate feedback ratings are described. In the following description, for purposes of explanation, numerous specific details are set forth in order to provide a thorough understanding of example embodiments. It will be evident, however, to one skilled in the art that the present invention may be practiced without these specific details.

In some embodiments, a system and method for providing feedback to a potential purchaser of a good or service is illustrated. This system and method may provide specific and unique feedback (e.g., feedback ratings), which, in some cases, is devoid of redundant, cumulative, or other types of information that do not contribute to educating a potential purchaser of a good or service about either the good or service or about the party selling the good or service. Further, this system and method may provide a potential purchaser with one or more visual clues as to the quality of the purchasing experience that actual purchasers have had with the particular party selling the good or service, and/or the good or service actually sold. In one embodiment, these visual clues may take the form of a graphical illustration (e.g., an emoticon), and/or various textual highlights displayed on a feedback page in the form of, for example, a Hyper Text Markup Language (HTML) based webpage.

Providing generalized feedback ratings for marketplace participants often lacks the specificity to be informative for a user. Example marketplace feedback scores may give a quantitative measure of user trustworthiness, but they may at the same time lack the requisite detail to be informative. This may be true even where the feedback may be categorized to include a plurality of positive, negative and neutral comments. More to the point, pure feedback scores, even if categorized by positives, negatives, and neutrals, may not differentiate between users.

While feedback may give a sense of how good or bad users are (e.g., in terms of the quality of service or goods they provide), it does not describe why the users may be good or bad. In some cases, it may be difficult to tell what qualities differentiate one buyer from another and one seller from another. For example, it may be important to know whether a particular market participant is good, for example, at communication, packaging, pricing or service. Further, in some cases, users (e.g., those who have actually purchased a good or service from a seller) may leave neutral or positive feedback to avoid confrontation or may put in information that relates to the quality of their business conduct. In some cases, without a proper tool to differentiate the feedback, potential customers may have to go through pages of text trying to glean particulars.

Some example embodiments may include providing potential purchasers with an ability to automatically extract representative textual phrases or tags from a marketplace feedback text. Once the feedback tags are extracted, graphical representations in the form of, for example, emoticons, may be attached to the feedback tags. Multiple feedback tags may have the same emoticons attached to them revealing the sentiments of users who have actually purchased a good or service from the seller.

In some embodiments, technology may be implemented that includes the visualization of reputation ratings by parsing the feedback and analyzing its text for specific pattern frequencies. Text size may be used, for example, to show popularity of feedback by displaying more frequently-used phrases in a bigger font. In other example embodiments, other visual differentiation techniques may be used to highlight or distinguish more frequently-used (or otherwise identified) phrases included in the feedback data. Uniqueness of the particular feedback is also considered. An emoticon icon (e.g., emoticon) may be generated based on the feedback and may be displayed.

Further, in some embodiments, a tool may provide users with a legend of emoticons used to visualize the feedback. The emoticons may be representative of emoticons specific to the feedback provided by a particular community and may be displayed automatically. Moreover, users may be given an option of using cached information, and may select whether the feedback information should come from the item category or from user feedback. Additionally, in some embodiments, users may be provided with hints to further explain the meaning of the icons and terms.

Example Technology

In some embodiments, the example technology may include allowing searching by a user (e.g., a seller of goods or services), an identifier (e.g., a screen name, handle, or numeric identifier), or allowing a user to pick a user name from cached user names. The potential purchaser may select and search for visualized feedback that may, for example, be presented in positive, negative, or neutral categories. Additionally, the potential purchaser may use emoticon legends (e.g., emoticon legends) that correspond to the feedback terms. Further, the more frequently-occurring feedback terms may be displayed in correspondingly larger font. Example embodiments may include using displayed terms or phrases which are clickable to expose further details about the feedback associated with these terms or phrases. Moreover, the technology may include demonstrating the frequency of use of the term or phrases by displaying the percentage of occurrence in the feedback.

Some example embodiments may include extracting representative textual phrases from a user's feedback text as "tags". These tags may be extracted to differentiate feedback for one user from that of another. For example, if all users have the text "AAAAA++++" in their feedback, this information does not serve to distinguish one user from another. In some embodiments, the example technology may extract other distinguishing phrases that summarize a user's (e.g., a seller's) feedback text. This information may be extracted at a global level, a category level, a domain level (e.g., static or dynamic), or at any other suitable level. Also, this information may be extracted for all the transactions that have occurred for all users in a given category to describe the most representative tags for that category feedback. For example, "very cute" may be a typical phrase in a positive feedback text in a bag category, "does not fit" may be a common phrase in an apparel category, and "wrong size" may be a common phrase in a jewelry-ring category.

Once the text is extracted, the information may be presented at a user level, across all categories, at a category level, domain level, or at some other suitable level. Example representations of the feedback may be shown with the text differentiated by its size (e.g., highlighted with larger text for more frequent phrases and smaller text for less frequent ones).

Further, in some embodiments, an example technology may represent text emoticons or sentiments that may have emoticons attached to them. This may be done by keeping a dictionary of phrases and mapping the phrases to a static set of emoticons. For example, "speedy shipping" and "fast delivery" may be associated with a common emoticon. Linguistic analysis and natural language processing may help to identify such similar phrases and map them to the same emoticon. Techniques of sentiment mining from small text may be used to attach sentiments to the tag phrases.

Example System

FIG. 1 is a diagram of an example system 100 illustrating the generation of feedback data. Shown is a reviewer 101 who, utilizing a GUI 112, generates positive feedback. GUI 112 may reside on any one of a number of devices 102 including, for example, a cell phone 103, a computer system 104, a television 105, and/or a Personal Digital Assistant (PDA) 106. Utilizing any one of these devices 102, the reviewer 101 may generate feedback data 126. This feedback data may be related to users who buy and sell good and services, feedback related to a category of sellers, buyer, good, services, or feedback relating to some other suitable transaction. Feedback data 126 may, in some cases, be positive feedback such as, for example, that a purchase the reviewer 101 made was "Best Purchase Ever". Further illustrated is a reviewer 124 who, utilizing the GUI 112, may generate neutral feedback. This neutral feedback may be in the form of, for example, feedback data 127, such as a statement that "Service Was About Average". Further, a reviewer 125 may generate negative feedback utilizing the GUI 112. This negative feedback may be, for example, feedback data 128 which states, for example, "Not A Good Experience" with regard to a particular transaction. The feedback data 126, 127, and 128 may be transmitted across a network 150 to, for example, a web server 130. Web server 130 may be operatively connected to, for example, an application server 131. Operatively connected to application server 131 may be, for example, a feedback data store 132. In certain embodiments, a plurality of web servers 130 may be used to receive feedback data, such as feedback data 126, 127 and 128. Further, a plurality of application servers 131 may be operatively connected to one or more of these web servers 130. Additionally, a database server (not pictured) may be operatively connected to the application server 131 and may be used to retrieve data from and store data to the feedback data store 132.

Figure 2:
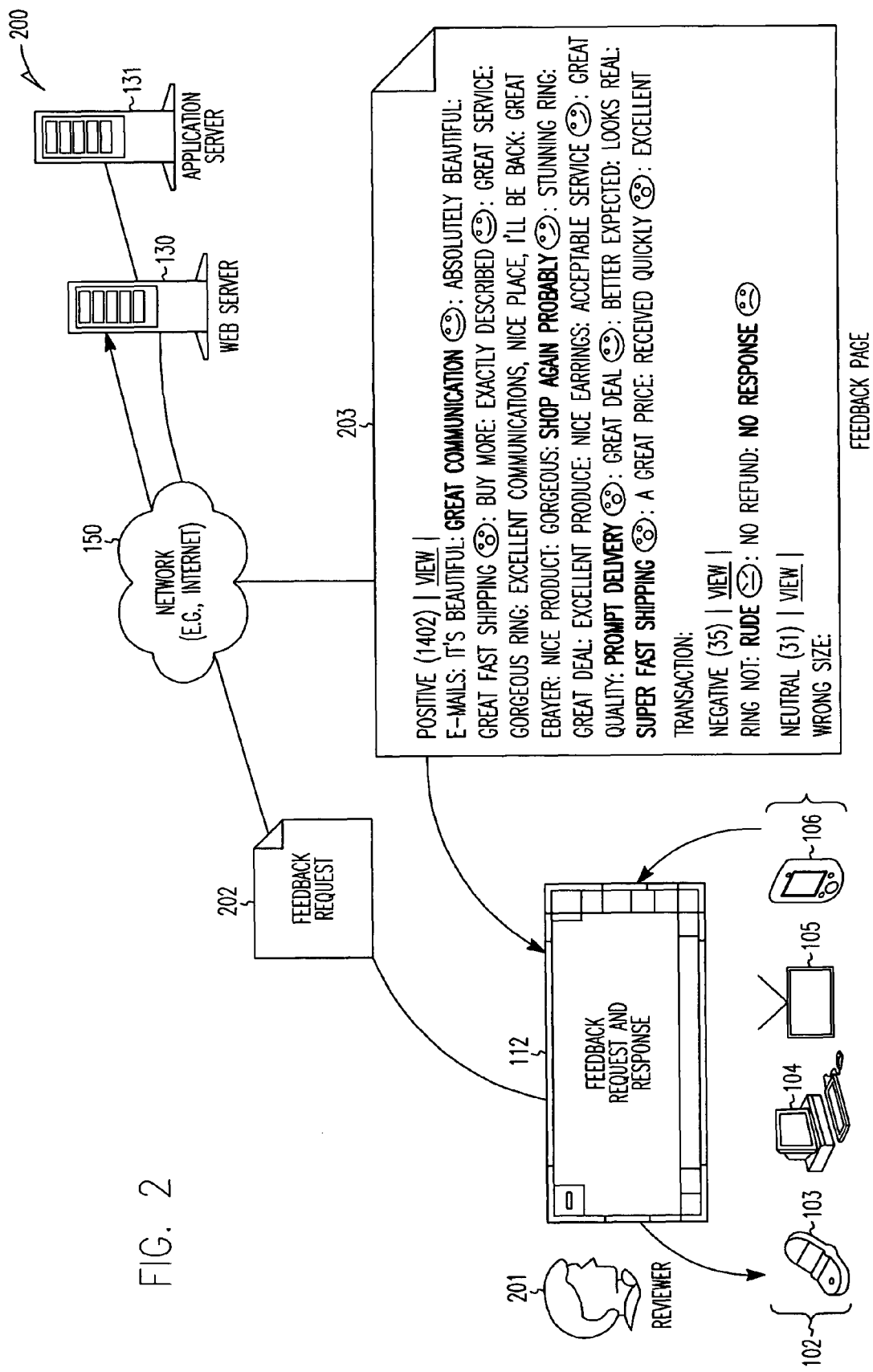
FIG. 2 is a diagram of a system illustrating the generation of a feedback page, according to an example embodiment.

FIG. 2 is a diagram of an example system 200 illustrating the generation of a feedback page. Illustrated is a reviewer 201 who, utilizing a GUI 112, generates a feedback request and receives a response to this feedback request in the form of a feedback page. For example, as illustrated, a feedback request 202 may be generated by the reviewer 201 utilizing the GUI 112. Feedback request 202 may, for example, contain information identifying a particular user (e.g., a seller who has transacted business on a particular website managed by a web server and associated application server). Feedback request 202 may be transmitted across the network 150 to the previously shown and illustrated web server 130, and may ultimately be processed by an application server 131. In response to the feedback request 202, a feedback page 203 may be generated. Feedback page 203 may be, for example, a web page written using HTML combined with certain technologies such as Asynchronous JavaScript and eXtensible Markup Language (AJAX), Dynamic HTML (DHTML), or even Active Server Pages (ASP). Feedback page 203 may then be transmitted by the web server 130 back across the network 150 for viewing on the GUI 112 by the reviewer 201. The process for generating feedback page 203 may be more fully illustrated below.

Example Screen Shots of Interfaces

In some embodiments, a feedback page 203 is displayed to a potential purchaser. Feedback page 203 may contain feedback regarding a particular seller of a good or service, or regarding a particular category of goods or services for sale. In one embodiment, when a potential purchaser clicks on a tag underlying the text displayed on the feedback page 203, an asynchronous request is sent to the server to obtain details for that tag. This asynchronous request may be generated using technology including, for example, AJAX, or DHTML. Once the asynchronous request is received, then feedback information related to that tag is extracted from a pool of feedback for that user. Next, in some cases, a percentage is computed to determine how many comments out of the total pool of comments (e.g., for that particular seller) actually relate to that specific tag. Then, in some embodiments, a feedback servlet again constructs the HTML to be displayed to the client (e.g., displayed as part of the feedback page 203). In some example embodiments, synchronous transmissions of web page queries are utilized in lieu of or in combination with the asynchronous queries. Further, technologies such as ASP may be utilized in lieu of servlets.

In some cases, a potential purchaser may generate a feedback request relating to comments regarding a seller, comments regarding another potential purchaser, a feedback score, a category of items for sale, a particular item, or some other type of suitable information pertinent to the sale of a good or service. This information may be supplied by purchasers or by others having access to this type of information.

Figure 3:
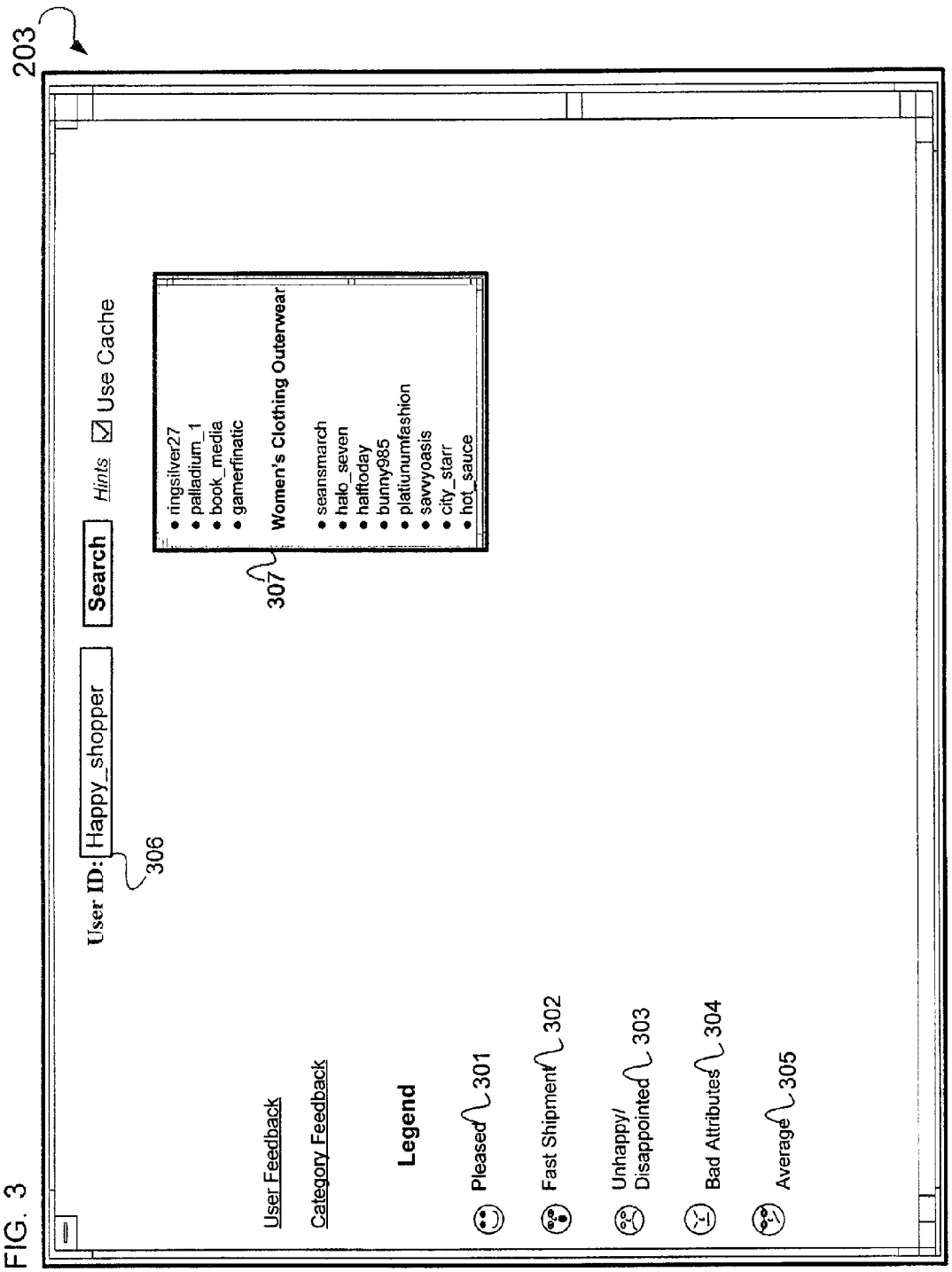
FIG. 3 is a Graphical User Interface (GUI) illustrating a feedback page, according to an example embodiment.

FIG. 3 is a GUI displaying an example feedback page 203 relating to category feedback. Shown is a legend outlining a number of graphical illustrations (e.g., emoticons). An emoticon 301 denotes that someone has been pleased with a particular experience that they have had with a user (e.g., a seller). An emoticon 302 is shown illustrating that a particular user has shipped something to a customer quickly. An emoticon 303 illustrates that a particular customer has had an unhappy or disappointing experience with a user. An emoticon 304 denotes that a particular user may have a bad attitude. Finally, an emoticon 305 denotes that a particular user may be average in terms of the experience that they have generated for a particular customer. Also shown is a screen object or widget in the form of a textbox 306 that allows a reviewer, such as reviewer 201, to insert a particular user identifier or user identifying information into this textbox 306. This user identifier may be some type of unique numeric value or may be some type of unique handle that may be used to identify a particular seller. Also illustrated is a menu 307 showing various names of sellers of various categories of goods. Shown here is a category of goods (e.g., a cache of users) in the form of "Women's Clothing-Outerwear" and various user handles associated with this category. In some embodiments, these user handles are related to individuals who are selling women's outerwear.

Figure 4:
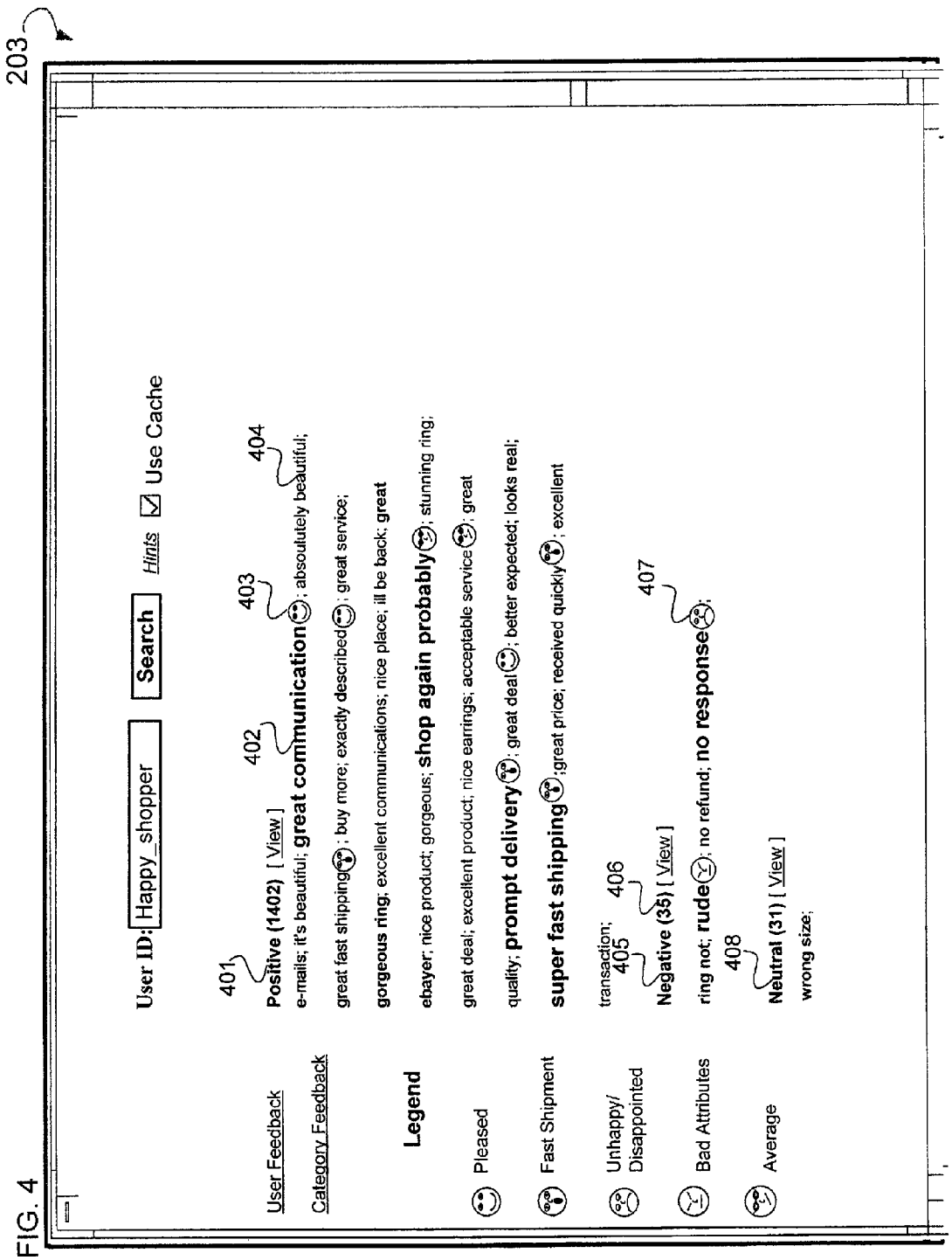
FIG. 4 is a GUI showing a feedback page with actual feedback for a particular user having the user ID "Happy Shopper", according to an example embodiment.

FIG. 4 is a GUI displaying an example feedback page 203 showing actual feedback for a particular user having the user ID "Happy_Shopper". Shown are a positive feedback field 401, a negative feedback field 405, and a neutral feedback field 408. With regard to the positive feedback field 401, a number of phrases and associated emoticons are illustrated. For example, the phrase "great communication" (referenced here as 402) is shown, which is in turn associated with an emoticon 403 denoting that someone is pleased (e.g., the previously-referenced emoticon 301). The phrase 402, in this particular example, appears in bold text to denote that this person has received a number of praises for facilitating great communication in a transaction beyond some particular threshold value. This notion of threshold value, as it relates to bolding or otherwise highlighting a particular phrase, will be more fully discussed below. Also shown is a phrase 404 that is not bolded or otherwise highlighted, wherein the user "Happy_Shopper" has received praise for selling "absolutely beautiful" items. The positive feedback field 401 has 1,402 entries associated with it. Also shown is the negative feedback field 405, illustrating negative feedback that the user "Happy_Shopper" has received. There are 35 negative feedback entries for this user, as indicated by the number displayed in field 406. For example, the user "Happy_Shopper" has been referred to by the phrase "no response," and has also been referenced by an emoticon 407, indicating that certain parties have been unhappy or disappointed with the user "Happy_Shopper" (e.g., emoticon 303). The phrase "no response" is bolded or otherwise highlighted to denote that a number of negative feedback responses or phrases illustrating negative feedback have been used to reference this particular user. Further, the neutral feedback field 408 is also shown wherein, for example, the user "Happy_Shopper" has provided the wrong size to one or more customers. The feedback fields 401, 405 and 408, and the data that is entered therein, may be supplied with data by certain reviewers, such as reviewer 101, 124 and 125. This process for generating a feedback page may be more fully illustrated below.

Figure 5:
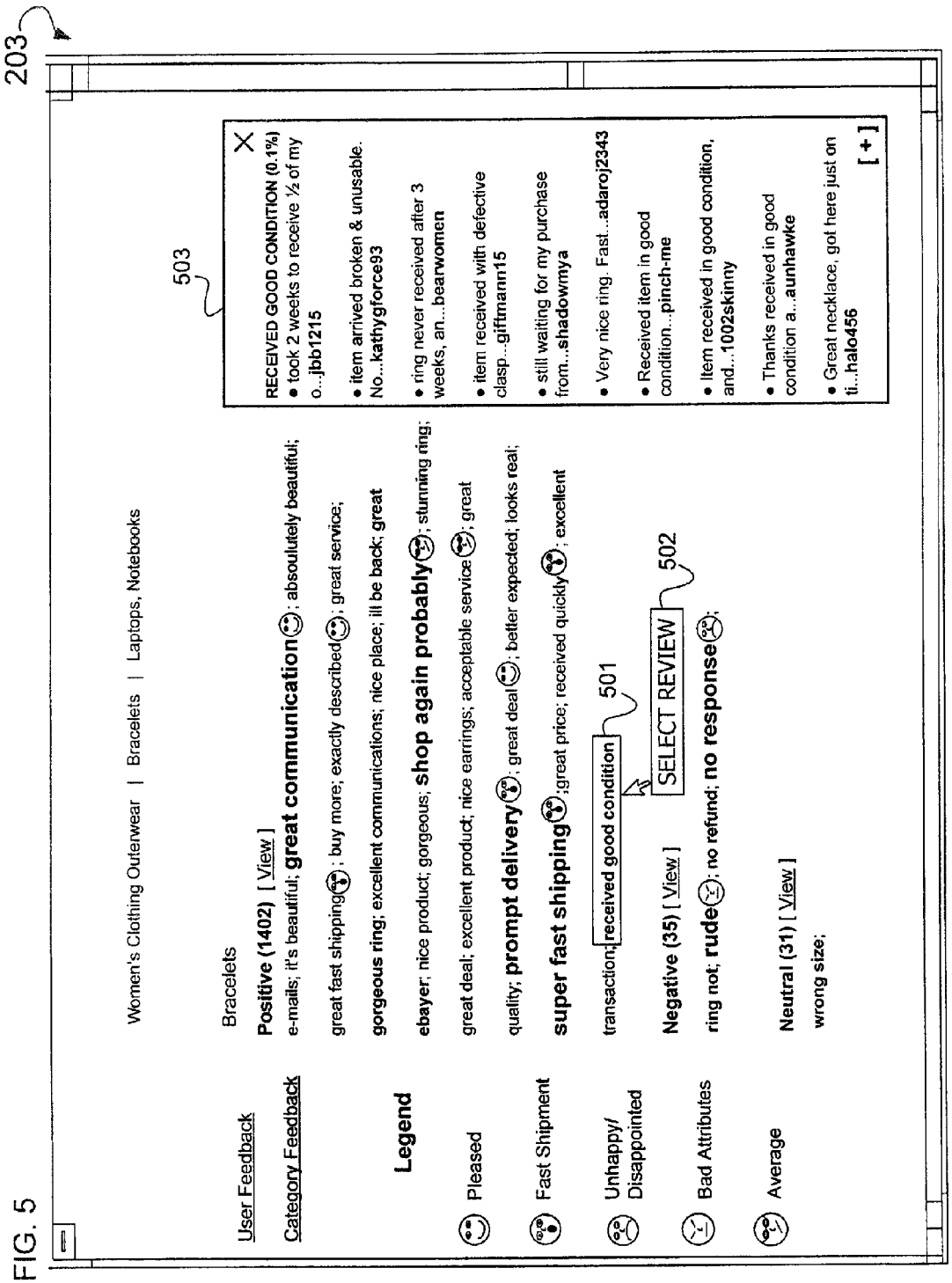
FIG. 5 is a GUI illustrating a feedback page showing specific information with regard to a particular phrase, according to an example embodiment.

FIG. 5 is a GUI displaying a feedback page 203 showing specific information with regard to a particular phrase. Illustrated is a phrase 501 that has been selected using a mouse pointer 502. Once the phrase 501 is selected, a screen widget or object containing the specific feedback that is used to generate phrase 501 is shown. Along with this specific feedback, the name or other identifying information of the party who generated the feedback is also provided. Here, for example, the phrase 501 that states that goods have been "received in good condition" is generated by, for example, the various pieces of feedback that are displayed in a screen object or widget 503. Also, the feedback provided in this screen object or widget 503 pertains to feedback relating to when items sold were "received in good condition", which here states that such feedback was only provided 0.1% of the time. Put another way, this good feedback is actually bad feedback where viewed into terms of the universe of data against which it is measured. Screen object or widget 503 may be, for example, a text display box.

Figure 6:
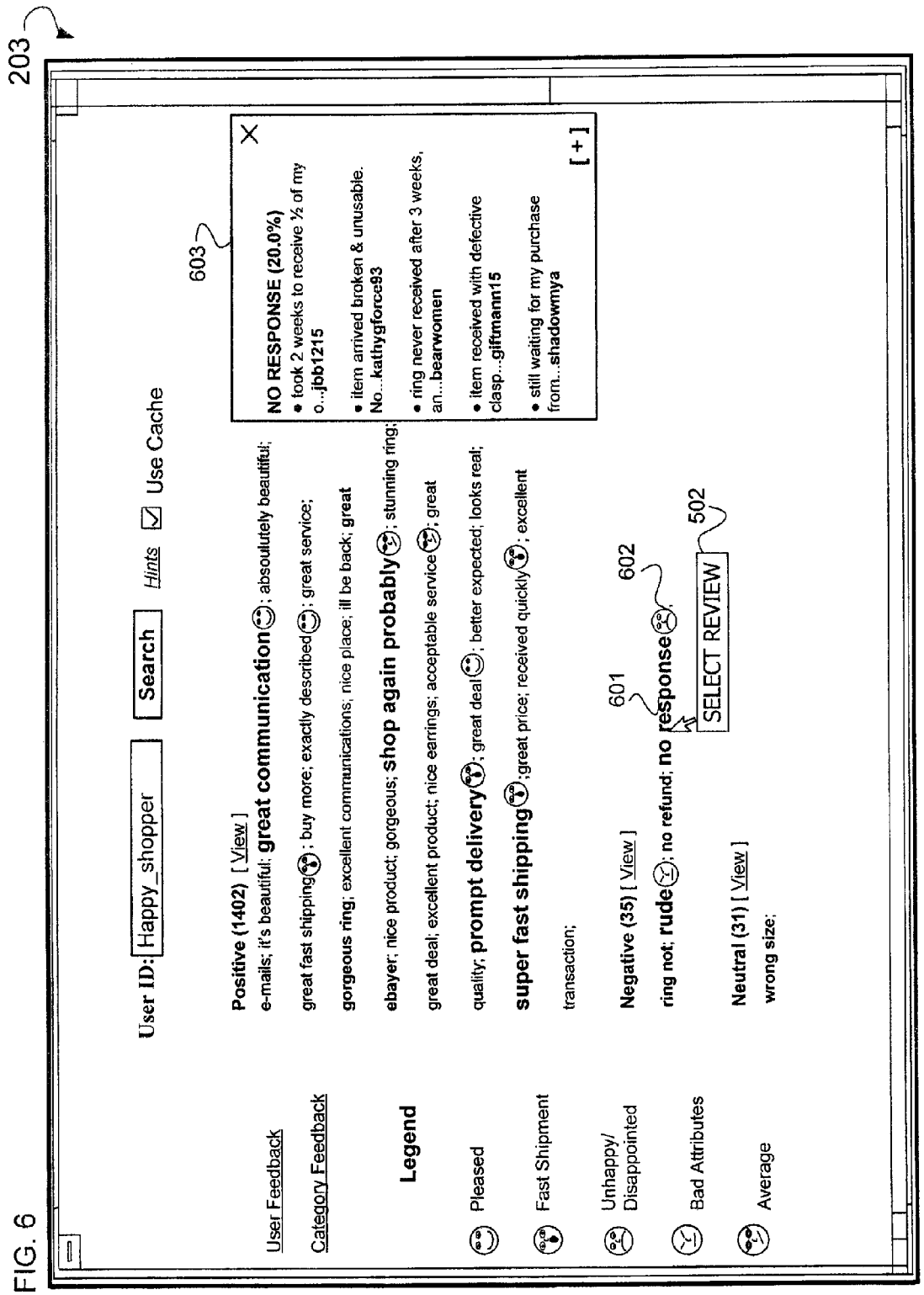
FIG. 6 is a GUI showing a feedback page illustrating negative feedback, according to an example embodiment.

FIG. 6 is a GUI displaying an example feedback page 203 illustrating negative feedback. Shown is a phrase 601 that states "no response." An emoticon 602 is associated with phrase 601, and denotes that one is unhappy or disappointed with a particular service they received from, for example, the user "Happy_Shopper". Using a mouse pointer 502, the phrase 601 may be selected such that a screen object or widget 603 is generated containing the various feedback data used to generate the phrase 601 and user IDs associated with the feedback data. In some cases, screen object or widget 603 may show a certain percentage value relating to the percent of total negative feedback that describes the user "Happy_Shopper" as having provided no response to customer queries.

Example Method

Figure 7:
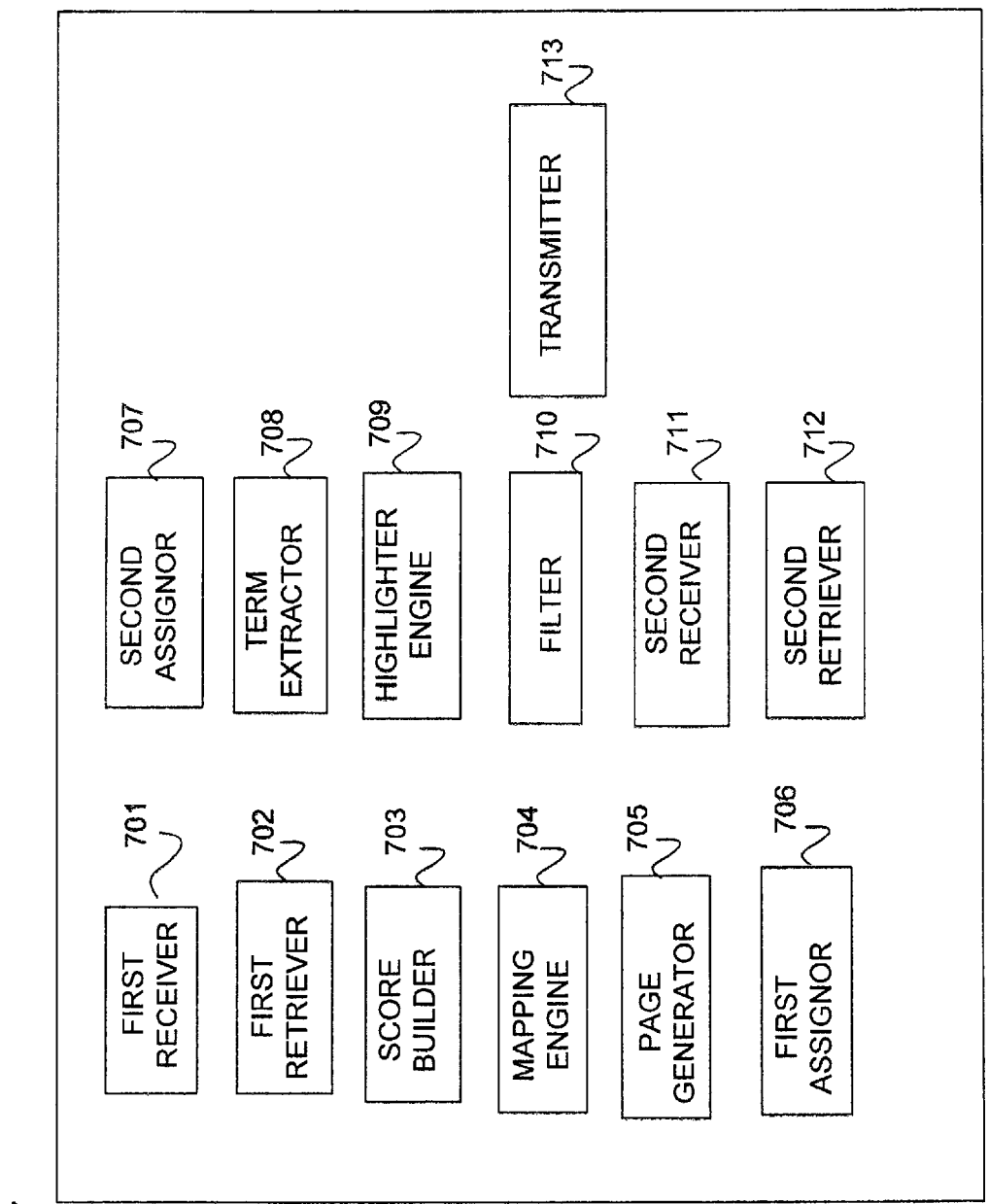
FIG. 7 is a block diagram of some of the functional blocks that make up an application server implementing the method illustrated herein, according to an example embodiment.

FIG. 7 is a block diagram of some of the functional blocks that make up the application server 131. These blocks may be implemented in hardware, firmware, or software. Illustrated is a first receiver 701 to receive a feedback request identifying a particular user, a first retriever 702 to retrieve a feedback entry in response to the feedback request, the feedback entry containing a first term, a score builder 703 to build a scoring model based, in part, upon a term frequency count denoting a frequency with which the first term appears in a searchable data structure, a mapping engine 704 to map the first term to a graphical illustration based upon a second term associated with the graphical illustration such that the graphical illustration may be used to represent the second term, and a page generator 705 to generate a feedback page containing the first term and the graphical illustration. Also shown is a first assigner 706 to assign a value to the first term so as to uniquely identify the first term, a second assigner 707 to assign the first term to the searchable data structure, and a term extractor 708 to extract the first term from the searchable data structure based, in part, upon an extraction rule. Moreover, the feedback entry may include at least one of positive, neutral, or negative feedback. A highlighter engine 709 is also shown that highlights the first term based upon the scoring model being the product of the term frequency count and an inverse document frequency value. This highlighter engine 709 may use a highlight including at least one of a font size highlight, a color highlight, an underline highlights, or a bold highlight. The searchable data structure may include at least one of a trie, hash table, red-black tree, or Binary Search Tree (BST). The graphical illustration may be emoticons. A filter 710 is shown that filters noise words from the feedback entry. Also shown is a second receiver 711 to receive an asynchronous feedback request generated, in part, through selecting a phrase appearing on the feedback page, a second retriever 712 to retrieve feedback information from a pool of feedback relating to the particular user, and a transmitter 713 to transmit the feedback information to be displayed on the feedback page. In some cases, the first term is part of at least one of a category level context, a global level context, a static domain level context, or a dynamic domain context.

Figure 8:
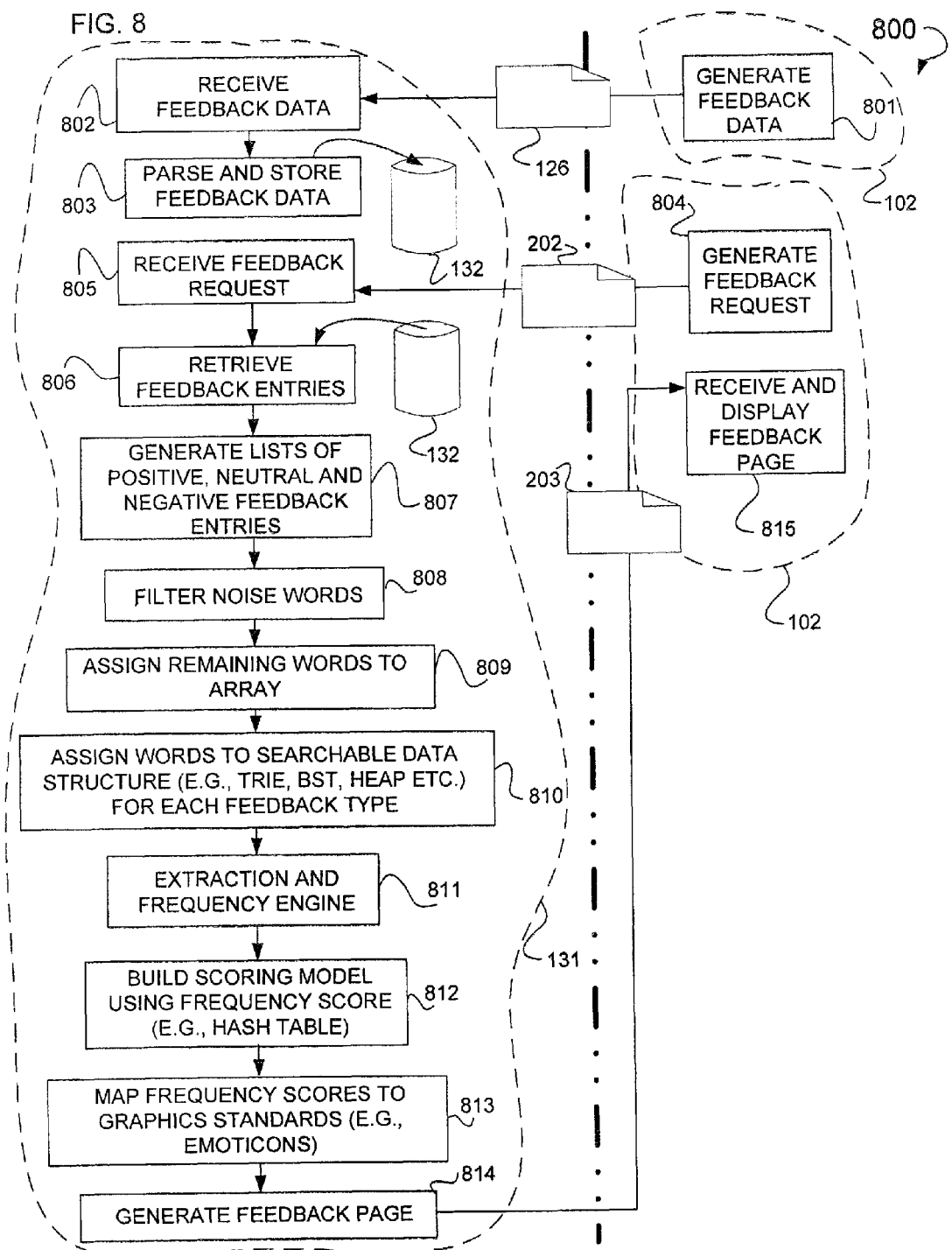
FIG. 8 is a dual stream flowchart illustrating a method used to generate feedback and then retrieve this feedback for the purpose of generating a feedback page, according to an example embodiment.

FIG. 8 is a dual stream flowchart illustrating an example method 800 used to generate feedback and then retrieve this feedback for the purpose of generating a feedback page. Illustrated is a first stream containing various operations that may reside as a part of, for example, the application server 131. These operations include operations 802, 803, and 805-814. Also shown is a second stream containing various operations that may reside as a part of the one or more devices 102. These include operations 801, 804 and 815.

With regard to the first stream, an operation 801 may be executed that generates feedback in the form of feedback data 126 that is then transmitted to, or otherwise received through, the execution of an operation 802. Once operation 802 is executed, an operation 803 may be executed that parses and stores feedback data 126 into feedback data store 132. This process of generating feedback data and subsequently parsing and storing it into a data store may serve to, for example, seed or otherwise populate a data store with user feedback. In some cases, this user feedback may be subsequently utilized for the generation of a feedback page, its associated graphical illustrations (e.g., emoticons), and phrases describing a particular user in terms of feedback regarding that user. Once feedback data store 132 is populated, a reviewer such as reviewer 201 may execute an operation 804 to generate a feedback request, such as feedback request 202. This feedback may be generated with respect to a particular user, category of good, services, at a static or dynamic domain context, or even for all transactions (e.g., globally). Further, these types of feedback may be combined. Next, through the execution of an operation 805, feedback request 202 may be received and processed. Once feedback request 202 has been received, an operation 806 may be executed that may retrieve feedback entries from, for example, the feedback data store 132. This operation 806 may use various Application Programming Interface (API) calls, or even calls generated using a Structured Query Language (SQL) to retrieve feedback entries. Then, an operation 807 may be executed that generates a list of positive, neutral, or negative feedback entries. Put another way, in some embodiments, a list containing only positive feedback may be generated, a list containing only neutral feedback may be generated, and a list containing only negative feedback may be generated. In lieu of a list, some other suitable data structure (e.g., a Binary Search Tree (BST), a stack, a queue, a double linked list) may be utilized.

Once these lists are generated, an operation 808 is executed that filters certain noise words, wherein these noise words may be contained in some type of predefined dictionary (e.g., a stop word dictionary). This dictionary may be based upon certain words that may be deemed to be uninformative or otherwise unhelpful in terms of facilitating a reviewer's, such as reviewer 201's, understanding of feedback regarding a particular user. The execution of operation 808 may be optional in some embodiments. Once operation 808 is executed, or if operation 808 is optionally not executed, the method 800 continues to an operation 809 that assigns any remaining words to an array, or some other suitable data structure, wherein a unique integer value is associated with each one of the words. Then, an operation 810 may be executed that assigns each one of these words to some type of searchable data structure, such as, for example, a trie, a BST, a heap, or a list. In some embodiments, a data structure may be generated for each feedback type (e.g., positive, neutral, and/or negative feedback), resulting in a plurality of data structures. An operation 811 may then be executed that extracts certain phrases from the searchable data structure (or plurality of searchable data structures) and passes these phrases through a frequency engine. In some embodiments, the frequency engine counts the number of times these phrases appear in all of the searchable data structures, or in some cases, only one or more of the searchable data structures.

An operation 812 is then executed that builds a scoring model using the frequency count. In some cases, this scoring model may, for example, be a hash table that contains a phrase and its frequency count based upon the aggregation of the frequency values for the words associated with the phrase. In some cases, this hash table may be implemented using bucket hashing or cluster hashing as may be suitable. In other cases, some other suitable data structure may be used such as, for example, a BST, heap, linked list, or doubly linked list. Next, an operation 813 is executed that maps or compares the frequency count for each of the phrases to certain graphic standards relating to particular graphical illustrations (e.g., emoticons). In effect, this comparison takes the phrase contained in a hash table entry and compares it to phrases associated with a particular emoticon. In some cases, a dictionary of sentiments, or emoticon mining system (collectively referenced herein as an emotion database) is implemented such that the phrases are compared to possible synonyms and where a match is found the corresponding emoticon is used. If, for example, the phrase "Best Purchase Ever" is considered to be synonymous with the phrase "Exactly Described", then the emoticon 301 denoting that one is "pleased" with a transaction might be appropriate. Once the phrases are mapped to an emoticon, an operation 814 is executed that generates a feedback page, such as feedback page 203. The generation of feedback page 203 may be more fully illustrated below, but includes, for example, the generation of an HTML-based page that contains, for example, the phrases and their respective emoticons. In some embodiments, the phrases themselves may be highlighted in some manner (e.g., font size, bolded font, italicized font, underlined font, color font, or some other suitable method of highlighting) where a particular phrase may need to stand out relative to other phrases contained in a particular field (e.g., a positive feedback field 401, negative feedback field 405, neutral feedback field 408). Some embodiments may include using a method of gradation based upon import to highlight certain phrases such that the more unique the phrase is relative to some universe of phrases, the great degree of highlighting it may receive. The method of gradation based upon import may be more fully discussed below is the section relating to the generation of the Inverse Document Frequency (e.g., referenced as idf) value.

Feedback page 203 may then be received through the execution of an operation 815 that may receive feedback page 203 and display it. In some embodiments, the execution of operation 815 may be carried out through some type of application capable of interpreting an HTML-based page, such as, for example, a web browser or other suitable application that may interpret, for example, HTML or XML. Further, through the execution of operation 815, details relating to a particular piece of feedback may be displayed (see e.g., phrase 501 selected with mouse pointer 502 so as to display the specifics of the selected phrase in screen object or widget 503).

Figure 9:
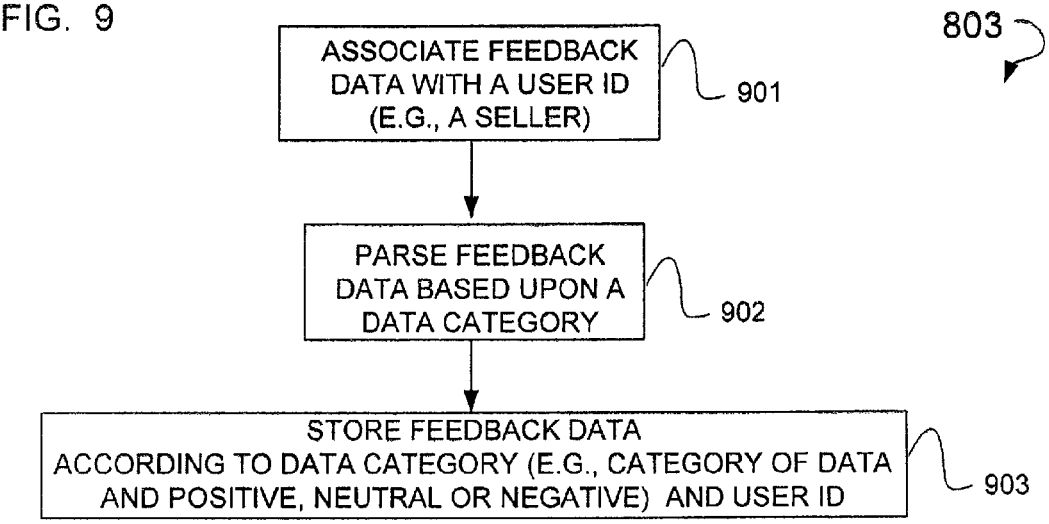
FIG. 9 is a flowchart illustrating a method used to execute an operation that parses and stores feedback data into a feedback data store, according to an example embodiment.

FIG. 9 is a flowchart illustrating an example method used to execute operation 803. Illustrated is an operation 901 that associates feedback data with a particular user ID, wherein this feedback data may be, for example, feedback data 126, 127, or 128. Next, an operation 902 is executed that parses the feedback database based upon some type of data category. This data category may be, for example, whether the feedback pertained to a particular seller or buyer, a particular category of item, a particular cost of an item or some other suitable category for which feedback may be provided. Next, an operation 903 is executed that stores feedback data according to a data category. For example, feedback data may be stored according to whether it pertained to a particular user, whether it was negative, positive, or neutral, or whether it pertained to a particular item, a cost of that item, or some other suitable category. Through the execution of operation 803, as previously illustrated, a feedback data store 132 may, in effect, be populated with data that may be used to generate a feedback page 203 at some later point.

Figure 10:
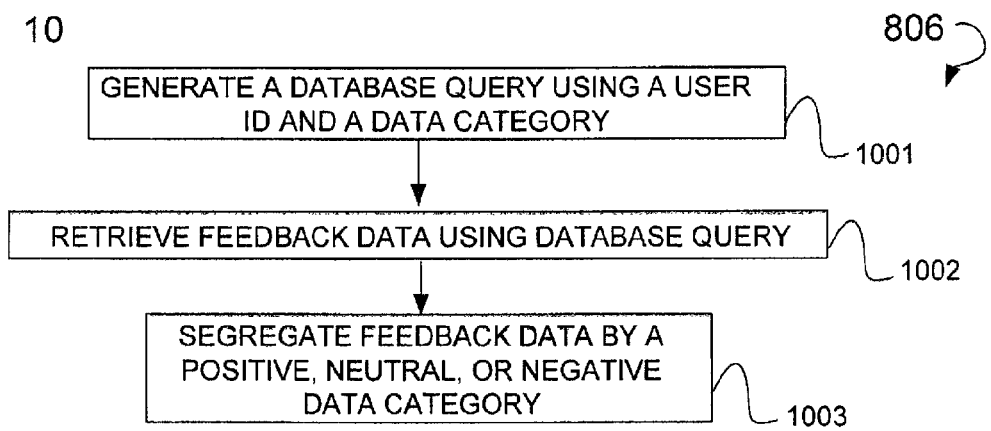
FIG. 10 is a flowchart illustrating a method used to execute an operation to retrieve feedback entries from a feedback data store, according to an example embodiment.

FIG. 10 is a flowchart illustrating an example method used to execute operation 806. Shown is an operation 1001 that generates a database query using a user ID and a data category. In some cases, this database query may be, for example, an SQL based query, API based query, while in other embodiments, it may be some other suitable query language (e.g., Multidimensional Expression (MDX) language) based query. Next, an operation 1002 may be executed that retrieves feedback data using the database query. This selection process, again, may be implemented utilizing some type of suitable query language and various methods or operations associated with this query language (e.g., select, from, where). Then, an operation 1003 is executed that segregates feedback data by positive, neutral or negative data categories.

FIG. 11 is a flowchart illustrating an example method used to execute operation 808. Illustrated is an operation 1101 that receives certain retrieved feedback data from a list of positive, neutral, or negative feedback, or in some cases, from multiple lists of positive, neutral, or negative feedback. The feedback data is, for the most part, text-based data. Then an operation 1102 is executed that cleans the feedback data by removing non-character elements. Non-character elements may be, for example, certain graphical references or other types of non-text-based data. An operation 1103 is then executed that may optionally remove noise words from the feedback data by comparing the text contained within the feedback data to a dictionary of noise words. The dictionary of noise words may be contained in, for example, a noise word database 1104, and as previously discussed, may be generated specifically for the purpose of excluding certain types of words. These types of words may include, for example, words that may be profane in nature or may otherwise not assist a reviewer 201 in understanding a feedback page 203 and the data (e.g., text) contained therein. Next, an operation 1105 is executed that generates cleaned comment text.

FIG. 12 is a flowchart illustrating an example method used to execute operation 809. Shown is an operation 1201 that receives clean comment text. An operation 1202 is then executed that generates an array of integers, where each of these integers uniquely corresponds to a word in the clean comment text. In some embodiments, a single array of integers is generated for all neutral, negative, or positive feedback. In other embodiments, an array of unique integers is generated only for the positive text, only for the neutral text, and only for the negative text. Further, another array of unique integers is generated only for the neutral text. In some embodiments, an array of unique integers is generated only for the negative text. Further, as illustrated elsewhere, some other suitable data structure containing this series of unique integers may be generated such that, for example, a list, a stack, a queue, or some other suitable data structure may be used.

Figure 13:
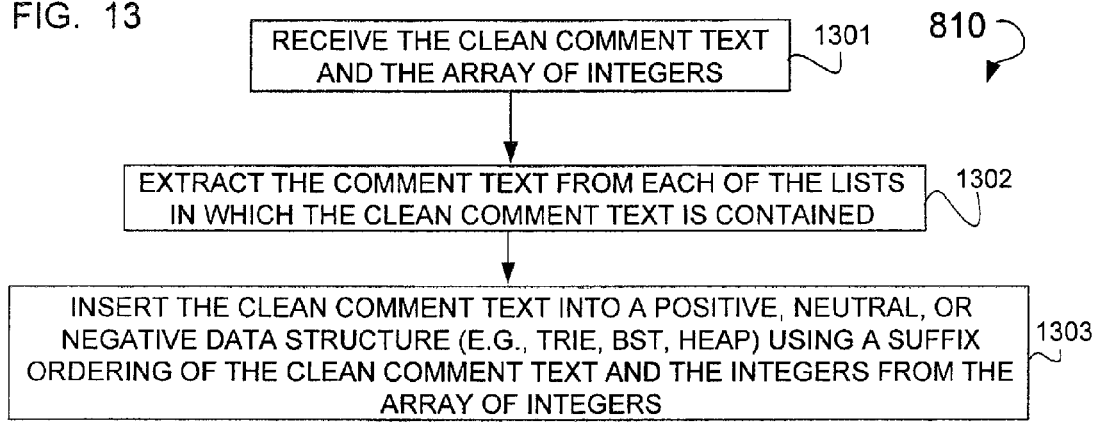
FIG. 13 is a flowchart illustrating a method used to execute an operation that assigns each word to some type of searchable data structure, according to an example embodiment.

FIG. 13 is a flowchart illustrating an example method used to execute operation 810. Shown is an operation 1301 that receives clean comment text and the previously shown array of integers. An operation 1302 is executed that extracts the clean comment text from each of the lists with which they are associated. Then, an operation 1303 is executed that inserts the clean comment text into one of a positive, neutral, or negative data structure, wherein this data structure may be, for example, a trie, a BST, a red-black tree, a heap, a hash table, or some other suitable data structure that may facilitate the search and retrieval of this clean comment text. In some cases a clean comment text is inserted using a suffix ordering and the integers from the array of integers. In some embodiments, a prefix ordering may be used in lieu of a suffix ordering. As will be more fully illustrated below, in one embodiment, a trie may be implemented wherein each node of the trie is uniquely identified with one of the unique integer values, and the links between each one of the nodes of the trie contain a particular word that is a part of a phrase contained in the clean comment text.

Figure 14:
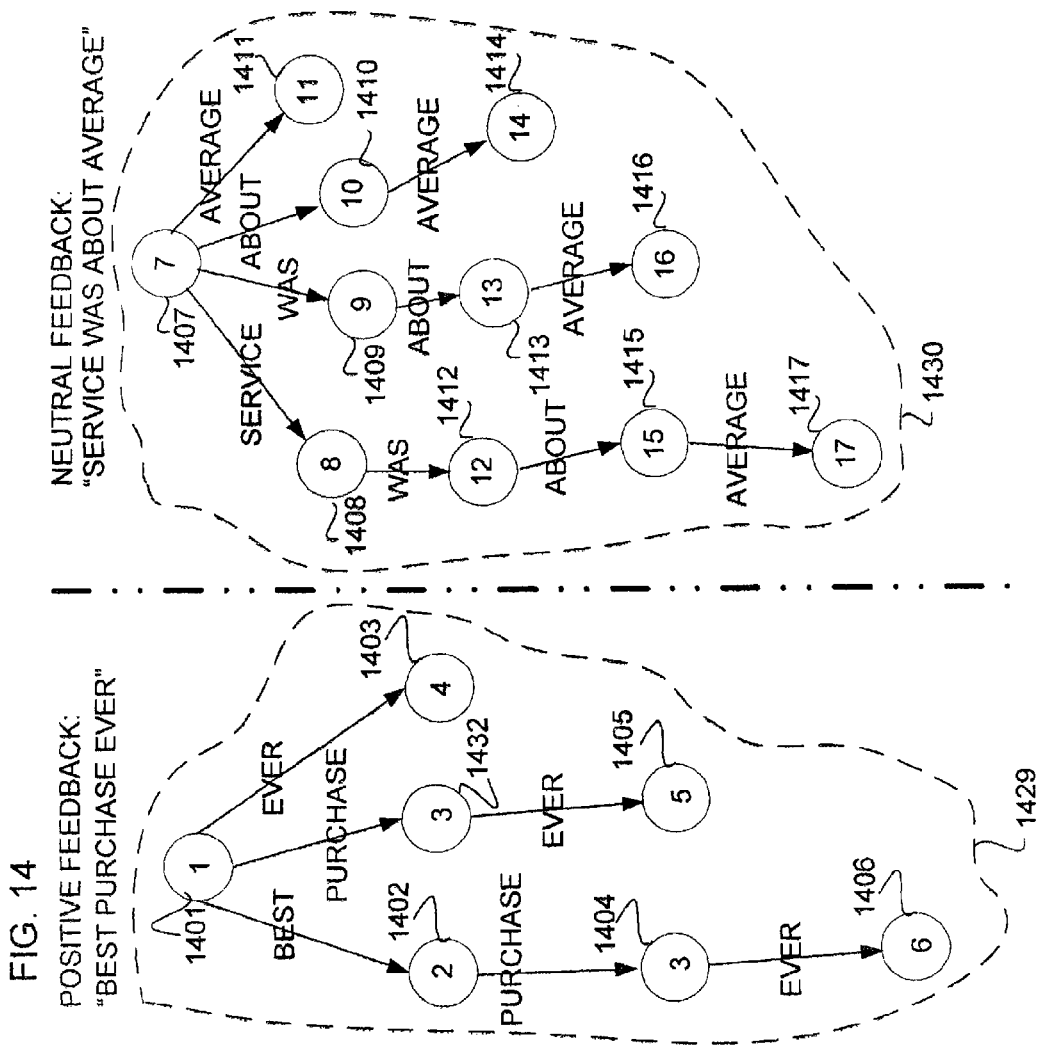
FIG. 14 is a diagram of a plurality of tries containing feedback data in the form of clean comment text, according to an example embodiment.

FIG. 14 is a diagram of a plurality of tries 1400 containing feedback data in the form of clean comment text. Shown are a first sub-trie 1429 containing positive feedback, a second sub-trie 1430 containing neutral feedback, and a third sub-trie 1431 containing negative feedback. These various sub-tries are, in some cases, part of larger tries showing positive, neutral, and negative feedback. With regard to the first sub-trie 1429, positive feedback in the form of the phrase "Best Purchase Ever" is illustrated. Using a suffix ordering, this phrase may be broken down such that a node 1401 (e.g., a root node) is created. This root, or parent, node has a number of child nodes, such as nodes 1402, 1432 and 1403. These child nodes are linked to their parent through various edges, wherein the edge connecting nodes 1401 and 1402 contain the word "Best", the edge connecting nodes 1401 and 1432 contain the word "Purchase", and the edge connecting nodes 1401 and 1403 contain the word "Ever". Node 1402 has its own child node 1404. Connecting the nodes 1402 and 1404 is an edge containing the word "Purchase". Node 1404 also has a child node, 1406, where this child node 1406 is, in effect, a leaf node. Connecting the nodes 1404 and 1406 is an edge containing the word "Ever". As to the node 1432, it too has a child node 1405 which is, in effect, a leaf node. Connecting nodes 1432 and 1405 is an edge containing the word "Ever". Next a node 1403, which acts as a leaf node, is connected to the root node 1401 by an edge containing the word "Ever". In one embodiment, the path from node 1401 to node 1406 is reflective of the previously-stated positive feedback (e.g., "Best Purchase Ever"). Subsequent paths or other paths through this first sub-trie 1429 create other phrases such as, for example, "Purchase Ever" (e.g., the path between node 1401 and 1405), or even just a single word being used to form a path (see e.g., the path between node 1401 and 1403).

The second sub-trie 1430 provides an illustration of a suffix ordering relating to neutral feedback in the form of the phrase "Service Was About Average". Shown is a root node 1407. Connected to root node 1407 are a number of child nodes including, for example, nodes 1408, 1409, 1410, and 1411. Some of these child nodes themselves have children, such that, for example, node 1408 has a child node 1412, node 1409 has a child node 1413, and node 1410 has a child node 1414. Again, some of these child nodes also have children, such that, for example, node 1412 has a child node 1415, and node 1413 has a child node 1416. Also illustrated is a leaf node 1417 that is a child of node 1415. Again traversing from the root node to the leaf nodes, there are a number of phrases that may be generated, such that, for example, traversing from the root node 1407 to the leaf node 1417, the phrase "Services Was About Average" may be generated. Likewise, traversing from the root node 1407 to the node 1416, the phrase "was about average" may generated. Similarly, traversing the path from root node 1407 to the node 1414, the phrase "About Average" may be generated, and traversing from the root node 1407 to the node 1411, the phrase, or in this case word, "Average" may be generated.

Further illustrated is a third sub-trie 1431 that relates to negative feedback that a particular user has received, for example, in the form of the phrase "Not A Good Experience". Shown as a part of trie 1431 is a root node 1418 having a number of child nodes 1419, 1420, 1421, and 1422. These child nodes themselves may have one or more children. For example, node 1423 is a child of the node 1419, node 1424 is a child of the node 1420, and node 1425 is a child of the node 1421. Other children illustrated herein include, for example, node 1426 as a child of node 1423, and node 1427 as a child of node 1424. Additionally, a leaf node 1428 is illustrated as a child of the node 1426. Trie 1431 may be traversed via following any one of a number of paths from the root node to various child or leaf nodes. The phrase "Not A Good Experience" may be generated through traversing the path from the root node 1418 to the child node 1428. Another path may be traversed from the root node 1418 to the child or leaf node 1427 wherein the phrase "A Good Experience" may be generated. Another phrase, "Good Experience," may be generated by traversing the path from the root node 1418 to the leaf node 1425, and yet another phrase, or in this case word, "Experience" may be generated by traversing the path between the node 1418 and the leaf node 1422. As illustrated elsewhere, some other suitable type of data structure may be used in lieu of tries to organize and traverse strings and substrings associated with positive, neutral, or negative feedback.

Figure 15:
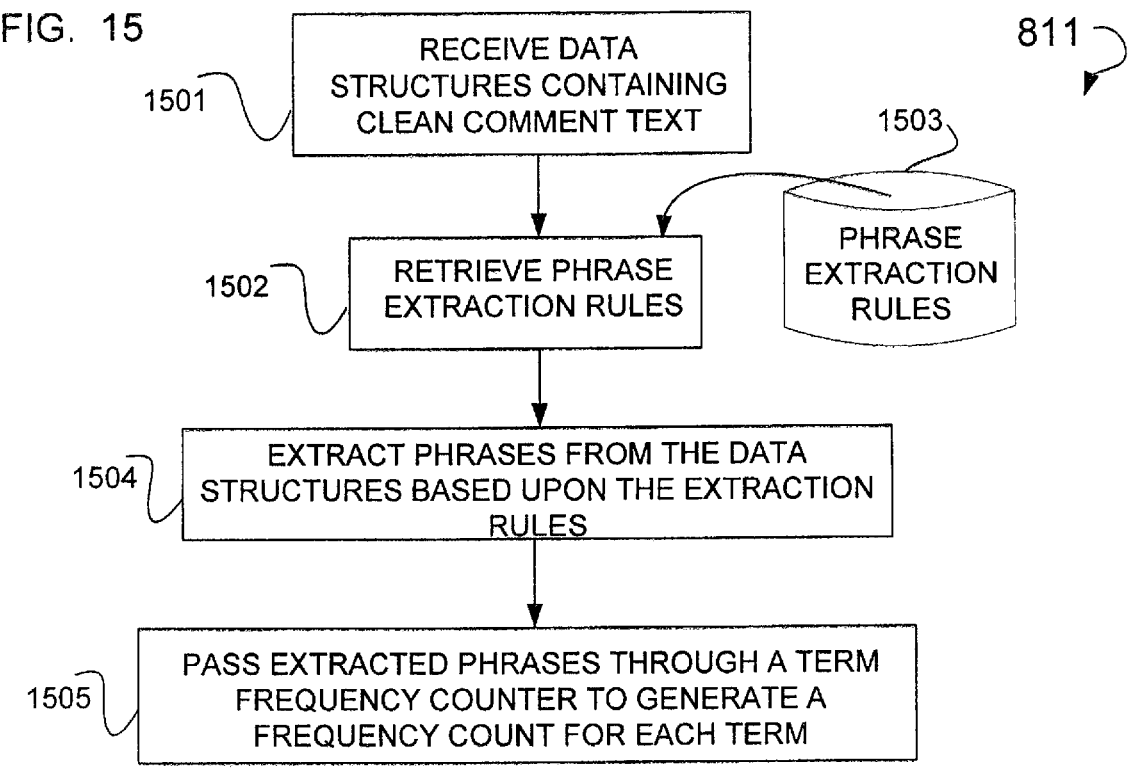
FIG. 15 is a flowchart illustrating a method used to execute an operation to extract certain phrases from a searchable data structure and to pass these phrases through a frequency engine, according to an example embodiment.

FIG. 15 is a flowchart illustrating an example method used to execute operation 811. Shown is an operation 1501 that receives a data structure containing clean comment text. Once the data structure(s) have been received, an operation 1502 is executed that retrieves certain phrase extraction rules from, for example, a phrase extraction rules database 1503. Then, an operation 1504 may be executed that extracts phrases from the data structures (e.g., the tries) based upon the phrase extraction rules. Next, an operation 1505 is executed that passes the extracted phrases through a term frequency counter to generate a frequency count for each of the terms. In some cases, the phrase extraction rules may set certain rules regarding what constitutes a phrase, such that a phrase may only contain one, two, three, or some other predefined series of words. Further, the words that make up a phrase may only be extracted, in some cases, when they have occurred a certain number of times. This certain number of times may be one, two, three, or some other predefined number of times. The generation of the extraction rules may be done by, for example, a system administrator or some other suitable individual, and may be stored as previously illustrated into the phrase extraction rules database 1503.

Figure 16:
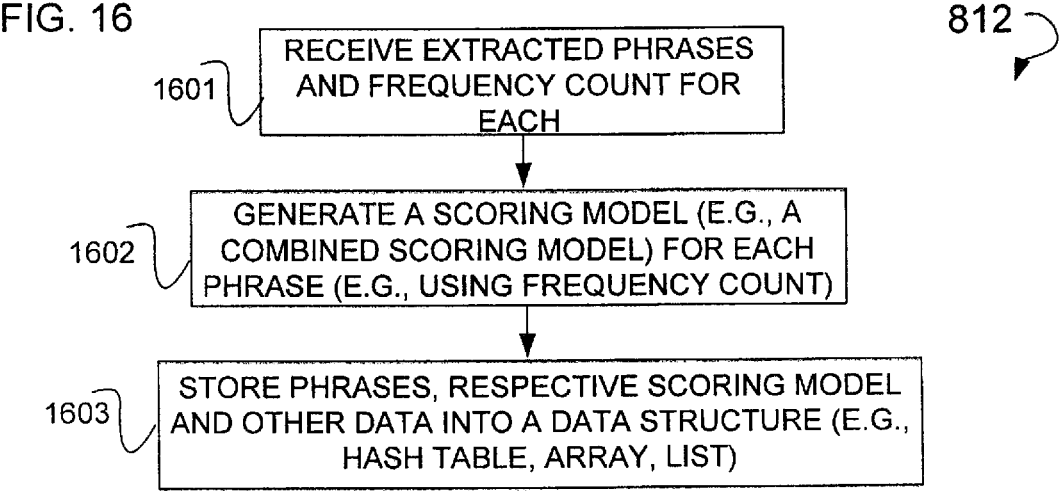
FIG. 16 is a flowchart illustrating a method used to execute an operation that builds a scoring model using a frequency count, according to an example embodiment.

FIG. 16 is a flowchart illustrating an example method used to execute operation 812. Shown is an operation 1601 that receives extracted phrases and a frequency count for each phrase. Next, an operation 1602 is executed that generates a scoring model for each phrase using, for example, a frequency count. Once the scoring model is generated, an operation 1603 is executed that stores the phrases, the respective scoring models, and other data into a data structure such as, for example, a hash table, an array, a list, or some other suitable data structure. In certain cases, the scoring model itself may be the data structure containing the extracted phrase as frequency count and other data. In other cases, a scoring model may just be, for example, data in the form of a phrase and its associated frequency count. In some embodiments, the frequency count may be generated based upon an aggregation of accounting of each word that makes up the phrase such that, for example, if there are three words that make up a phrase and each word has a frequency count of 60, then the frequency count for the phrase would be 180.

In some embodiments, another scoring model (e.g., a combined scoring model value) may be utilized in lieu of or in conjunction with the frequency count. This combined scoring model value may be generated based upon, for example, the product of a term's frequency (e.g., its term frequency (tf), or frequency count), and the number of documents that contain that term for a particular user (e.g., a buyer or seller) as compared to a given universe of documents (e.g., the universe of all user feedback) (e.g., idf value). In one embodiment, once the hash table is built for all phrases extracted, the combined scoring model value is then computed for each phrase using a tf value for global data, and an idf value for global data. In one embodiment, this tf*idf score may be stated as:

Combined scoring model value=$tf*idf$;

where tf=((number of times phrase "X" occurs for seller A)/(max term frequency for seller A)); and
idf=log 2((number of documents[e.g., feedback comments] in the dataset)/(number of times phrase X occurred in the entire dataset)).

In some embodiments, the combined scoring model value is stored into the previously-referenced data structure along with the term or phrase. Further, in some embodiments, the combined scoring model value is computed separately and is not stored into the data structure. In some embodiments, the combined scoring model value may be based upon some other suitable expression used to determine the frequency of a phrase and the terms contained therein.

In some embodiments, the idf value may be more significant where the phrases used to describe a buyer or seller more closely approximates, for example, the universe of all words or phrases to describe sellers in general. If "Happy_Shopper" is described as "An unparalleled Seller" three times in feedback related to them, and the phrase "An unparalleled Seller" is only used three times in the universe of all seller feedback, then the idf value will taken on greater significance. In some cases, the use of an idf value may ensure the uniqueness of a phrase relative to the universe of phrases within which the phrase may be found. This idf value may also be used to determine the gradation based upon import of a phrase such that the phrase may be highlighted to a greater or lesser degree. For example, if the idf value is close to 1, then the phrase may appear bigger (e.g., larger font), be represented in a unique color or have some other way of representing it as distinct from other phrases that may appear on a feedback page such as feedback page 203.

Figure 17:
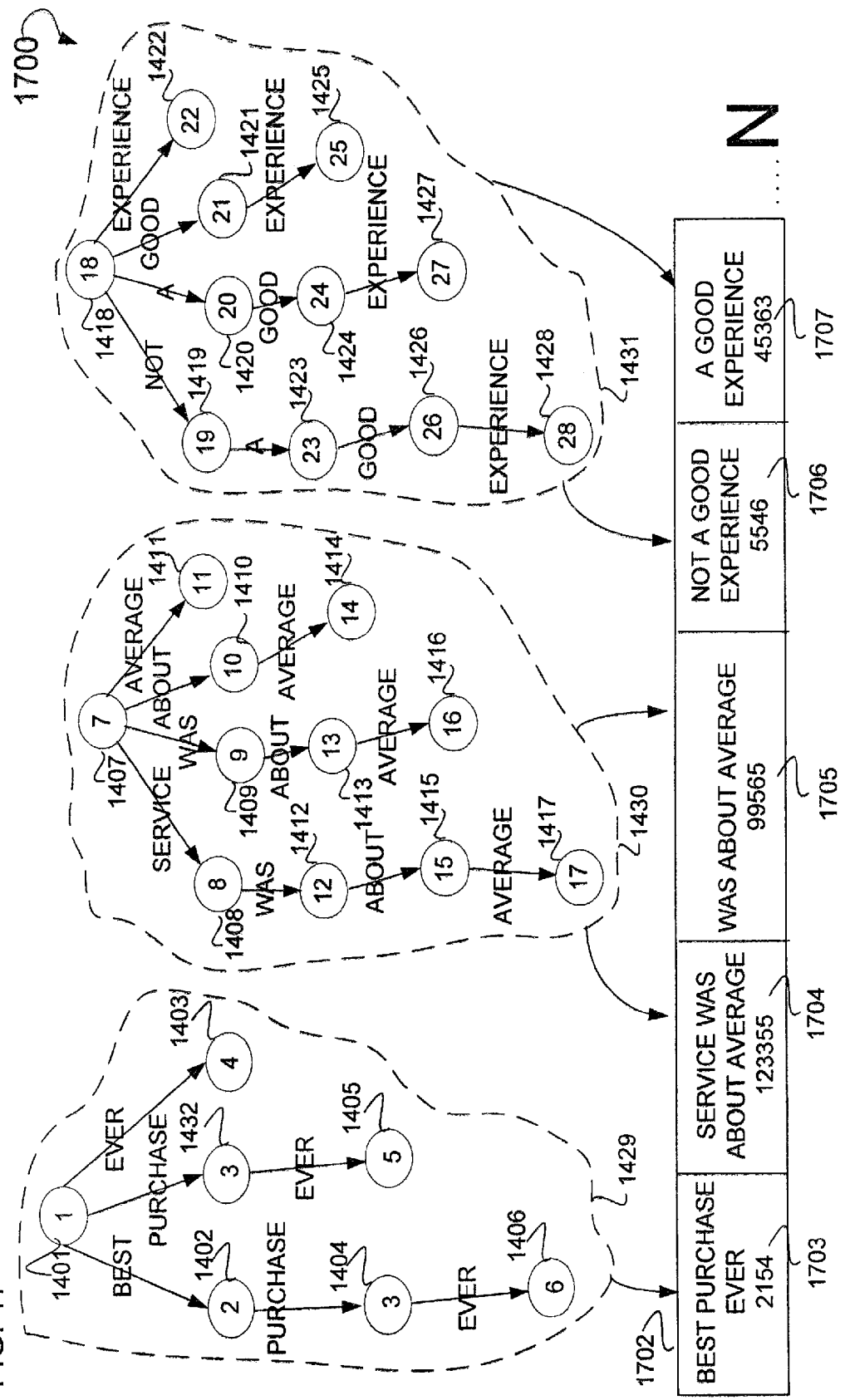
FIG. 17 is a diagram illustrating the conversion of the previously illustrated tries into a data structure (e.g., a hash table), according to an example embodiment.

FIG. 17 is a diagram 1700 illustrating the conversion of the previously illustrated tries (see FIG. 14) into the data structure (e.g., a hash table) generated by the execution of the operation 1603. Shown are the previously-illustrated first sub-trie 1429, second sub-trie 1430, and third sub-trie 1431. These tries, and the phrases contained therein, may be parsed such that the phrases generated through the traversing of a path from a root node to the leaf node may be extracted. This extraction may be on the basis of, for example, certain types of phrase extraction rules as outlined in FIG. 15. Once extraction occurs and a frequency count is generated for, in some embodiments, the aggregation of the frequency values for each word contained in a phrase, these phrases and associated frequency counts are then placed into at least one position in, for example, a hash table 1702. Shown is a first position 1703 that contains the phrase "Best Purchase Ever" and the corresponding count values associated with this phrase, which here is 2154. Further, a second position 1704 in the hash table 1702 contains the phrase "Service Was About Average", which has a frequency count of 123355. A third position 1705 is illustrated that contains the phrase "Was About Average" with a frequency count of 99565. Also illustrated is a fourth position 1706 that contains the phrase "Not A Good Experience" with a frequency count of 5546, and a fifth position 1707 containing the phrase "A Good Experience" with a frequency count of 45363. In some embodiments, a combined scoring model value may be associated with the phrase and may be placed into a position within the hash table, either in lieu of or together with the frequency count. As previously stated, hash table 1702 may, in some embodiments, use bucket hashing, hash clustering or some other suitable embodiment or implementation of a hash table.

FIG. 18 is a flowchart illustrating an example method used to execute operation 813. Illustrated is an operation 1801 that extracts a scoring model from a data structure and discards certain phrases and models below a certain threshold value. As previously discussed, this scoring model may be, for example, the aggregation of scores contained in a hash table, such as hash table 1702, wherein an entire hash table may be discarded based upon the aggregation of the low scores associated with the various entries into the hash table (e.g., frequency counts associated with certain phrases). In other cases, certain specific entries in the hash table may be discarded based upon their low frequency count. The certain threshold value may be predetermined by, for example, a system administrator or other suitable individual. Upon the successful execution of operation 1801, an operation 1803 may be executed that maps the remaining phrases and corresponding models to an emoticon database 1802 that may contain certain graphic illustrations (e.g., emoticons) representing the model. In some cases, the various frequency counts for a particular phrase may be mapped to certain values contained in emoticon database 1802. If a phrase has a frequency count of 1,000, and an emoticon has a threshold value of 1,000, then the emoticon may be used. Next, an operation 1804 is executed that retrieves an emoticon as a mapping use in generating a feedback page. Put another way, once the mapping occurs through the execution of operation 1803, then certain emoticons may be retrieved and used in the generation of, for example, a feedback page such as feedback page 203.

FIG. 19 is a flowchart illustrating an example method used to execute operation 814. Shown is an operation 1901 that receives phrases and graphic emoticons. Once the phrases and emoticons have been received, an operation 1902 is executed that sorts these phrases and emoticons into a feedback page such as, for example, feedback page 203. An operation 1903 is then executed that retrieves threshold instructions relating to, for example, font size, highlighting, bolding, or other types of threshold instructions from, for example, a threshold instruction database 1904. Next, an operation 1905 is executed that modifies the font size and/or highlighting for phrases on the feedback page, where certain thresholds are met or exceeded. The threshold instructions for the threshold instruction database 1904 may be generated by, for example, a system administrator or other suitable person.

In some embodiments, the modification of the font size or other types of highlighting relating to a particular phrase may occur where the combined scoring model results in some the generation of some value (e.g., the combined scoring model value). In cases where this value falls within one particular area of the gradation based upon import to highlight, then the font size, color, or some other way of distinguishing the phrase form other phrases contained in the feedback will be applied. In some cases, the larger the combined scoring model value, the more uniquely highlighted the phrase will be. For example, under the threshold instructions, phrases with a combined scoring model value of >100 are entitled to receive 16 point font, while those <=100 are entitled to only 12 point font. And again, pursuant to the threshold instructions, phrases with a value of >200 may be entitled to being highlighted in the color red, but those with a value of <200 are entitled to no special coloring other than black.

Example Storage

Some embodiments may include the various databases (e.g., 132, 1104, or 1503) being relational databases, or in some cases On-Line Analytical Processing (OLAP) based databases. In the case of relational databases, various tables of data are created, and data is inserted into and/or selected from these tables using SQL or some other database-query language known in the art. In the case of OLAP databases, one or more multi-dimensional cubes or hypercubes containing multidimensional data, which data is selected from or inserted into using MDX, may be implemented. In the case of a database using tables and SQL, a database application such as, for example, MYSQL™, SQLSERVER™, Oracle 8I™, 10G™, or some other suitable database application may be used to manage the data. In the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. These tables or cubes made up of tables, in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Figure 20:
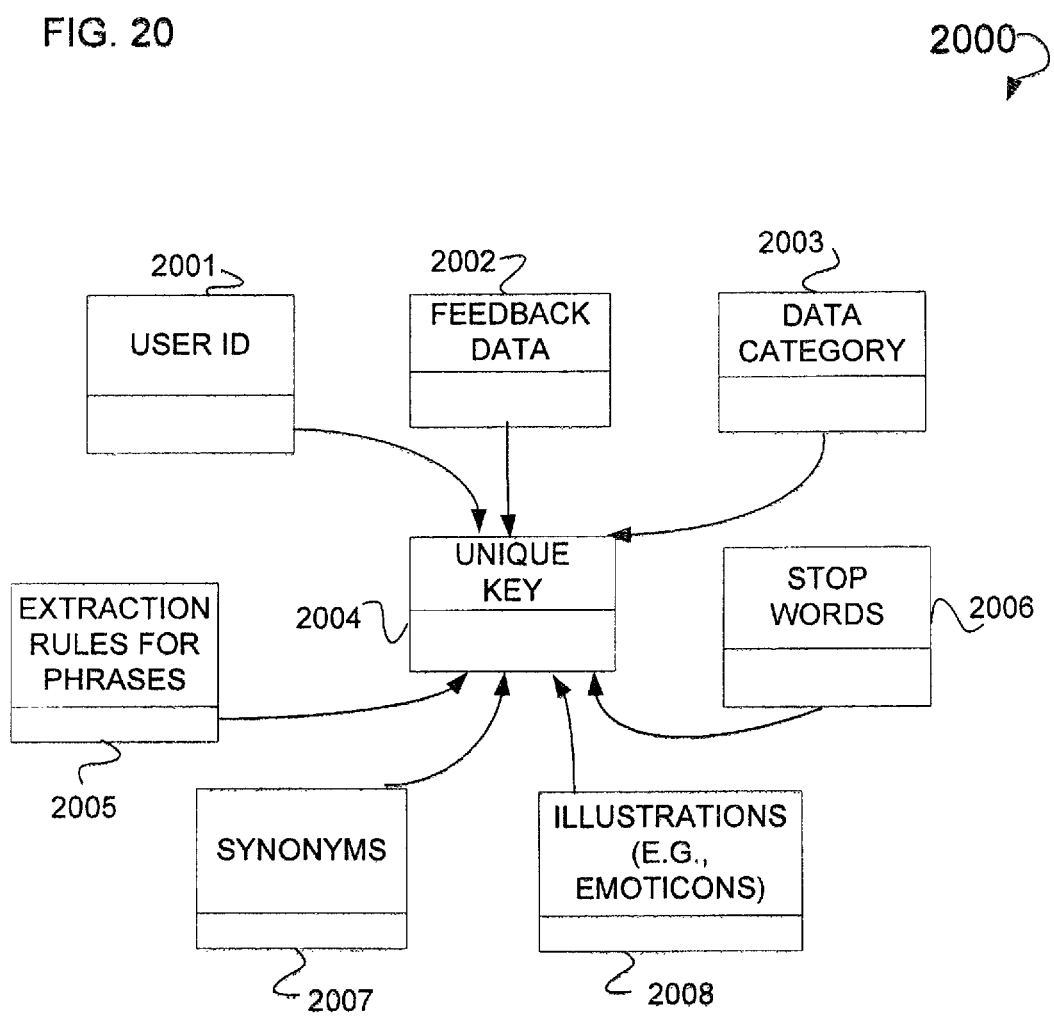
FIG. 20 is a Relational Data Schema (RDS) illustrating some of the example database tables that may be used in one or more embodiments of the system and method illustrated herein, according to an example embodiment.

FIG. 20 is an example RDS 2000 illustrating some of the example database tables that may be used in one or more embodiments of the system and method illustrated herein. Shown is a user ID table 2001 that may contain user ID data. This user ID data may be in the form of, for example, a user handle, such as the previously-shown user handle "Happy_Shopper", or may be some other type of identifier such as a numeric reference. In cases where a handle is used, the user ID may be, for example, a string data type or character data type. In cases where a numerical value is used, the user ID may be, for example, an integer data type. Also shown is a feedback data table 2002 containing feedback data. The data contained in feedback data table 2002 may be, for example, data illustrating or otherwise showing negative, neutral, or positive feedback. This feedback data may be in the form of, for example, a string data type, a Character Large Object (CLOB) data type, or even just a character data type. Also illustrated is a table 2003 in the form of data category. In some embodiments, table 2003 may include various categories of data that may be used to characterize or otherwise categorize particular types of feedback beyond just whether or not the particular type of feedback is positive, negative, or neutral. For example, these categories may include comment text, a common user category, a rule category, a feedback score category, a category of item, a cost of item, or some other suitable category. A data category may be, for example, a string data type, a character data type, or some other suitable data type.

Also shown is an extraction rules for phrases table 2005 containing various extraction rules for certain phrases. In some embodiments, while the tables 2001 through 2003 may reside on, for example, the feedback data store 132, the extraction rules for phrases table 2005 may reside as a part of, for example, the phrase extraction rules database 1503. Extraction rules may include rules regarding the number of words that may make up a phrase that may be able to be extracted, the frequency with which these words may appear across a plurality of phrases, such that these words may be used in a phrase that is extracted, or some other suitable set of rules. Also shown is a synonyms table 2007 that may reside as a part of the emotions database 1802. These rules may be in the form of strings or character data types wherein, for example, if a negative phrase is determined to by synonymous with a string in the emotions database 1802, then that phrase may be associated with an emoticon. Also shown is an illustrations table 2008 that may reside on, for example, the emoticon database 1802. Illustrations table 2008 may contain graphic illustrations in the form of, for example, emoticons. The illustrations table 2008 may contain, for example, a Binary Large Object (BLOB) that contains a binary representation of the actual graphic illustration (e.g., the emoticon).

Further, a stop word table 2006 is shown that may reside as a part of, for example, the noise word database 1104. Stop word table 206 may be optional, but when used or otherwise implemented, it may contain a plurality of stop words such that if one of these stop words is encountered in a phrase, that word is then removed from the phrase or, more generally, from a particular piece of feedback data (e.g., 126, 127 and/or 128). These stop words may be generated by, for example, a system administrator, and may be in the form of, for example, a string data type. Further illustrated is a unique key table 2004 that provides a unique key value for one or more of the tables illustrated herein (e.g., 2001-2003, 2005-2008). These unique key values may be in the form of, for example, an integer or some other uniquely identifying numeric value or plurality of unique identifying numeric values.

A Three-Tier Architecture

In some embodiments, a method is described as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier and/or to a backend, or storage tier. These logical/mathematical manipulations may relate to certain business rules, or processes that govern the software application as a whole. A third, storage tier, may be a persistent or non-persistent storage medium. In some cases, one or more of these tiers may be collapsed into another, resulting in a two-tier or even a one-tier architecture. For example, the interface and logic tiers may be consolidated, or the logic and storage tiers may be consolidated, as in the case of a software application with an embedded database. This three-tier architecture may be implemented using one technology, or as will be discussed below, a variety of technologies. This three-tier architecture, and the technologies through which it is implemented, may be executed on two or more computer systems organized in a server-client, peer to peer, or some other suitable configuration. Further, these three tiers may be distributed between more than one computer system as various software components.

Component Design

Some example embodiments may include the above described tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Enterprise Java Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may reside on a first computer system that is located remotely from a second computer system containing a logic component (e.g., a logic tier). These first and second computer systems may be configured in a server-client, peer-to-peer, or some other suitable configuration. These various components may be written using the above-described object-oriented programming techniques, and can be written in the same programming language or in different programming languages. Various protocols may be implemented to enable these various components to communicate regardless of the programming language(s) used to write them. For example, a component written in C++ may be able to communicate with another component written in the Java programming language through use of a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or the Transmission Control Protocol/Internet Protocol (TCP/IP) protocol stack model for defining the protocols used by a network to transmit data.

A System of Transmission Between a Server and Client

Some embodiments may utilize the Open Systems Interconnection (OSI) basic reference model or Transmission Control Protocol/Internet Protocol (TCP/IP) protocol stack model for defining the protocols used by a network to transmit data. In applying these models, a system of data transmission between a server and client, or between peer computer systems is described as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. The TCP segment also contains port information for a recipient software application residing remotely. The TCP segment is loaded into the data load field of an IP datagram residing at the network layer. Next, the IP datagram is loaded into a frame residing at the data link layer. This frame is then encoded at the physical layer, and the data is transmitted over a network such as an internet, Local Area Network (LAN), Wide Area Network (WAN), or some other suitable network. In some cases, the word 'internet' refers to a network of networks. These networks may use a variety of protocols for the exchange of data, including the aforementioned TCP/IP as well as ATM, SNA, SDI, or some other suitable protocol. These networks may be organized within a variety of topologies (e.g., a star topology) or structures.

A Computer System

Figure 21:
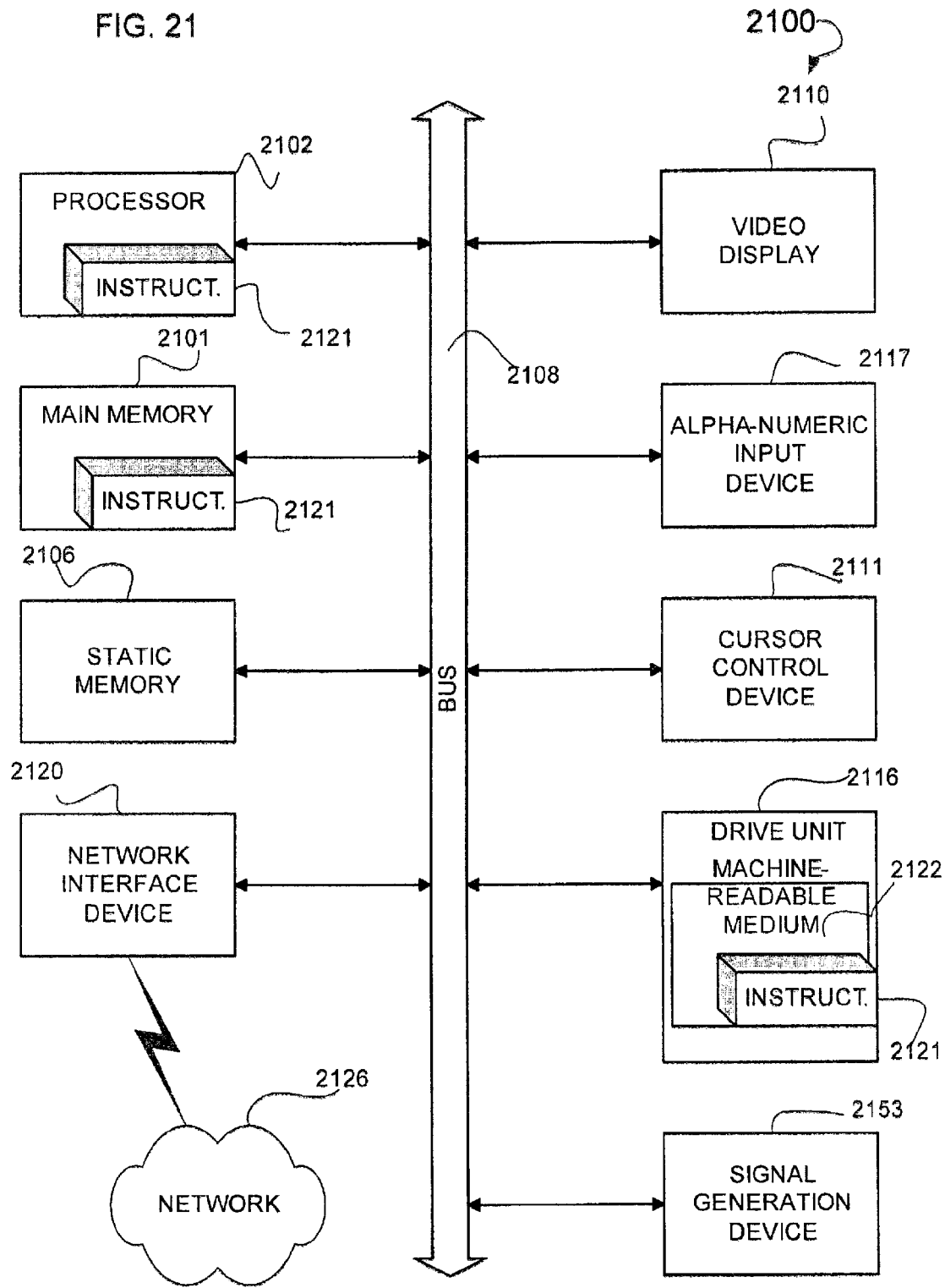
FIG. 21 shows a diagrammatic representation of a machine in the form of a computer system, according to an example embodiment.

FIG. 21 shows a diagrammatic representation of a machine in the example form of a computer system 2100 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems that are linked (e.g., either by hardwired, wireless, or a combination of hardwired and wireless connections) through a network, both perform tasks. In a distributed system environment, program modules may be located in both local and remote memory-storage devices (see below).

The example computer system 2100 includes a processor 2102 (e.g., a Central Processing Unit (CPU), a Graphics Processing Unit (GPU) or both), a main memory 2101 and a static memory 2106, which communicate with each other via a bus 2108. The computer system 2100 may further include a video display unit 2110 (e.g., a Liquid Crystal Display (LCD) or a Cathode Ray Tube (CRT)). The computer system 2100 also includes an alphanumeric input device 2117 (e.g., a keyboard), a User Interface (UI) cursor controller 2111 (e.g., a mouse), a disk drive unit 2116, a signal generation device 2153 (e.g., a speaker) and a network interface device (e.g., a transmitter) 2120.

The disk drive unit 2116 includes a machine-readable medium 2122 on which is stored one or more sets of instructions 2121 and data structures (e.g., software) embodying or utilized by any one or more of the methodologies or functions described herein. The software may also reside, completely or at least partially, within the main memory 2101 and/or within the processor 2102 during execution thereof by the computer system 2100, the main memory 2101 and the processor 2102 also constituting machine-readable media.

The instructions 2121 may further be transmitted or received over a network 2126 via the network interface device 2120 utilizing any one of a number of well-known transfer protocols (e.g., HTTP, SIP).

In some embodiments, a removable physical storage medium is shown to be a single medium, and the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies described herein. The term "machine-readable medium" shall accordingly be taken to include, but not be limited to, solid-state memories, optical and magnetic media, and carrier wave signals.

Marketplace Applications

In some embodiments, a system and method is illustrated that facilitates the generation of feedback that is useful and non-cumulative by removing redundant information or only providing useful feedback information. Feedback regarding a particular seller of a good or service may only be useful insofar as it instructs a potential purchaser regarding specific information about a seller and/or the good or services that are being sold. In cases where this feedback is merely cumulative, the feedback is not informative. Feedback that is informative will attract more potential purchasers, since these purchasers may be more able to research the sellers and the goods or services being sold on, for example, a website.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving a request to retrieve a plurality of feedback entries about a particular user, the plurality of feedback entries submitted by a plurality of other users, the request including an identifier of the particular user;
retrieving the plurality of feedback entries in response to the request, a portion of the plurality of the feedback entries containing a first term, each retrieved feedback entry being about the particular user identified by the identifier in the request;
building a scoring model implemented by one or more processors, the scoring model based, in part, upon a term frequency count denoting a frequency with which the first term is associated with the particular user in the plurality of the feedback entries in a searchable data structure;
mapping, using the one or more processors, the first term to a graphical illustration, the mapping based upon a second term associated with the graphical illustration; and
generating a feedback page containing the first term and the graphical illustration.

2. The method of claim 1, further comprising:
assigning a value to the first term so as to identify the first term;
assigning the first term to the searchable data structure; and
extracting the first term from the searchable data structure based, in part, upon an extraction rule.

3. The method of claim 1, wherein the plurality of feedback entries includes at least one of positive, neutral, or negative feedback.

4. The method of claim 1, further comprising highlighting the first term based upon a score related to the scoring model, the score being a product of the term frequency count and an inverse document frequency value.

5. The method of claim 4, wherein the first term is part of at least one of a category level context, a global level context, a static domain level context, or a dynamic domain context.

6. The method of claim 4, further comprising highlighting using a highlight including at least one of a font size highlight, a color highlight, a underline highlights, or a bold highlight.

7. The method of claim 1, wherein the searchable data structure is at least one of a trie, hash table, red-black tree, or Binary Search Tree (BST).

8. The method of claim 1, wherein the graphical illustration are emoticons.

9. The method of claim 1, further comprising filtering a noise word from a feedback entry of the plurality of feedback entries.

10. The method of claim 1, further comprising:
receiving an asynchronous feedback request generated, in part, through selecting a phrase appearing on the feedback page;
retrieving feedback information from a pool of feedback relating to the particular user; and
transmitting the feedback information to be displayed on the feedback page.

11. A computer system comprising:
a memory to store a plurality of feedback entries; and
a processor in electronic communication with the memory to implement:
a first receiver to receive a request to retrieve the plurality of feedback entries about a particular user, the plurality of feedback entries submitted by a plurality of other users, the request including an identifier of the particular user;
a first retriever to retrieve the plurality of feedback entries in response to the request, a portion of the plurality of feedback entries containing a first term, each retrieved feedback entry being about the particular user identified by the identifier in the request;
a score builder to build a scoring model based, in part, upon a term frequency count denoting a frequency with which the first term is associated with the particular user in the plurality of the feedback entries in a searchable data structure;
a mapping engine to map the first term to a graphical illustration, the mapping based upon a second term associated with the graphical illustration; and
a page generator to generate a feedback page containing the first term and the graphical illustration.

12. The computer system of claim 11, further comprising:
a first assigner to assign a value to the first term so as to identify the first term;
a second assigner to assign the first term to the searchable data structure; and
a term extractor to extract the first term from the searchable data structure based, in part, upon an extraction rule.

13. The computer system of claim 11, wherein the plurality of the feedback entries includes at least one of positive, neutral, or negative feedback.

14. The computer system of claim 11, further comprising a highlighter engine to highlight the first term based upon a score related to the scoring model, the score being a product of the term frequency count and an inverse document frequency value.

15. The computer system of claim 14, wherein the first term is part of at least one of a group consisting of category level context, a global level context, a static domain level context, and a dynamic domain context.

16. The computer system of claim 14, further comprising the highlighter engine using a highlight including at least one of a group of highlights consisting of font size highlight, a color highlight, a underline highlights, and a bold highlight.

17. The computer system of claim 11, wherein the searchable data structure is at least one of a group consisting of trie, hash table, red-black tree, and Binary Search Tree (BST).

18. The computer system of claim 11, wherein the graphical illustration is an emoticon.

19. The computer system of claim 11, further comprising a filter to filter a noise word from one feedback entry of the plurality of the feedback entries.

20. The computer system of claim 11, further comprising:
a second receiver to receive an asynchronous feedback request generated, in part, through selecting a phrase appearing on the feedback page;
a second retriever to retrieve feedback information from a pool of feedback relating to the particular user; and
a transmitter to transmit the feedback information to be displayed on the feedback page.

21. An apparatus comprising:
means for receiving a request to retrieve a plurality of feedback entries about a particular user, the feedback entries submitted by other users, the request including an identifier of the particular user;
means for retrieving the plurality of feedback entries in response to the request, a portion of the plurality of the feedback entries each containing a first term, each retrieved feedback entry being about the particular user identified by the identifier in the request;
means for building a scoring model implemented by one or more processors, the scoring model based, in part, upon a term frequency count denoting a frequency with which the first term is associated with the particular user in the plurality of the feedback entries in a searchable data structure;
means for mapping, using the one or more processors, the first term to a graphical illustration, the mapping based upon a second term associated with the graphical illustration; and
means for generating a feedback page containing the first term and the graphical illustration.

22. A non-transitory machine-readable storage medium comprising instructions, which when implemented by one or more machines, cause the one or more machines to perform operations comprising:
receiving a request to retrieve a plurality of feedback entries about a particular user, the plurality of feedback entries submitted by a plurality of other users, the request including an identifier of the particular user;
retrieving the plurality of feedback entries in response to the request, a portion of the plurality of the feedback entries containing a first term, each retrieved feedback entry being about the particular user identified by the identifier in the request;
building a scoring model implemented by one or more processors, the scoring model based, in part, upon a term frequency count denoting a frequency with which the first term is associated with the particular user in the plurality of the feedback entries in a searchable data structure;
mapping, using the one or more processors, the first term to a graphical illustration, the mapping based upon a second term associated with the graphical illustration; and
generating a feedback page containing the first term and the graphical illustration.

* * * * *